United States Patent
Harrington et al.

(10) Patent No.: US 12,199,733 B2
(45) Date of Patent: Jan. 14, 2025

(54) WIRELESS COMMUNICATION MODULATION USING ELECTROMAGNETIC POLARIZATION

(71) Applicant: Hughes Network Systems, LLC, Germantown, MD (US)

(72) Inventors: Emanuel Harrington, Bowie, MD (US); David McLaurin, San Jose, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 70 days.

(21) Appl. No.: 18/092,112

(22) Filed: Dec. 30, 2022

(65) Prior Publication Data

US 2024/0223262 A1    Jul. 4, 2024

(51) Int. Cl.
  *H04B 7/10* (2017.01)
  *H04L 27/20* (2006.01)
(52) U.S. Cl.
  CPC ............ *H04B 7/10* (2013.01); *H04L 27/20* (2013.01)
(58) Field of Classification Search
  CPC ............................ H04B 7/10; H04L 27/20
  See application file for complete search history.

(56) References Cited

U.S. PATENT DOCUMENTS

| | | |
|---|---|---|
| 7,639,597 B2 | 12/2009 | Shattil |
| 8,036,307 B2 | 10/2011 | Raleigh et al. |
| 8,098,750 B2 | 1/2012 | Mueck et al. |

(Continued)

FOREIGN PATENT DOCUMENTS

| | | |
|---|---|---|
| CN | 101682467 A | 3/2010 |
| CN | 1615624 B | 8/2012 |

(Continued)

OTHER PUBLICATIONS comtechefdata.com [online] "Adaptive Coding and Modulation (ACM) in the CDM-625 Advanced Satellite Modem," Jun. 2009, retrieved on Jul. 6, 2023, retrieved from URL <http://www.comtechefdata.com/files/articles_papers/wp-cdm625_acm_white_paper.pdf>, 14 pages.

(Continued)

*Primary Examiner* — Freshteh N Aghdam
(74) *Attorney, Agent, or Firm* — Fish & Richardson P.C.

(57) ABSTRACT

Methods, systems, and apparatus, including computer programs encoded on computer storage media, for wireless communication with modulation using electromagnetic polarization. In some implementations, a device receives input data to transmit over a wireless communication channel, and the device has a (i) first antenna feed to receive signals for transmission with a first polarization and (ii) a second antenna feed to receive signals for transmission with a second polarization. The device modulates a radiofrequency carrier to generate modulated output that encodes a first subset of the input data, then upconverts the modulated output of the modulator to generate upconverted output. The device varies a polarization with which the upconverted output is transmitted based on a second subset of the input data, such that the input data is transmitted using both (i) modulation of the radiofrequency carrier signal and (ii) variation of the polarization with which the modulated signal is transmitted.

20 Claims, 11 Drawing Sheets

(56) References Cited

U.S. PATENT DOCUMENTS

| | | | |
|---|---|---|---|
| 8,213,795 | B2 | 7/2012 | Han et al. |
| 8,326,249 | B2 | 12/2012 | Cezanne et al. |
| 8,417,126 | B2 | 4/2013 | Mandai et al. |
| 8,805,188 | B2 | 8/2014 | Kikuchi |
| 9,048,887 | B2 * | 6/2015 | Coon .................. H04B 7/0608 |
| 9,485,076 | B2 | 11/2016 | Bowers et al. |
| 9,634,786 | B2 | 4/2017 | Zheng et al. |
| 9,660,716 | B2 | 5/2017 | Qin et al. |
| 10,116,410 | B2 | 10/2018 | Morsy-Osman et al. |
| 10,122,489 | B2 | 11/2018 | Nakashima |
| 10,218,436 | B2 | 2/2019 | Heismann |
| 10,630,510 | B2 | 4/2020 | Pratt et al. |
| 11,664,924 | B2 | 5/2023 | Liau et al. |
| 2010/0207819 | A1 * | 8/2010 | Uhl ...................... H01Q 3/2605 |
| | | | 342/372 |
| 2012/0106450 | A1 | 5/2012 | Elbwart |
| 2015/0215013 | A1 * | 7/2015 | Strong .................... H04B 7/10 |
| | | | 370/336 |
| 2017/0070280 | A1 | 3/2017 | Henarejos Hernandez et al. |
| 2017/0353338 | A1 * | 12/2017 | Amadjikpe .......... H01Q 21/245 |
| 2018/0183545 | A1 | 6/2018 | Subramamiam et al. |
| 2018/0278324 | A1 | 9/2018 | Qin et al. |
| 2019/0132044 | A1 | 5/2019 | Hreha et al. |
| 2020/0145069 | A1 | 5/2020 | Ferrante et al. |
| 2021/0006963 | A1 | 1/2021 | Chauhan et al. |
| 2021/0099247 | A1 | 4/2021 | Liau et al. |
| 2021/0351507 | A1 * | 11/2021 | Gorbachov ............ H01Q 21/24 |

FOREIGN PATENT DOCUMENTS

| | | | |
|---|---|---|---|
| CN | 102017524 | B | 4/2014 |
| CN | 104468048 | A | 3/2015 |
| CN | 109075952 | A | 12/2018 |
| WO | WO 2003/043235 | | 5/2003 |
| WO | WO-2010052530 A1 * | 5/2010 | ........... G01S 13/885 |
| WO | WO 2022/226084 | | 10/2022 |

OTHER PUBLICATIONS comtechefdata.com [online] "Adaptive Coding and Modulation (ACM)," 2019, retrieved on Jul. 6, 2023, retrieved from URL <https://www.comtechefdata.com/technologies/acm>, 3 pages.

Hughes.com [online] "Jupiter System Bandwidth Efficiency," Nov. 2015, retrieved on Jul. 6, 2023, retrieved from URL <https://www.hughes.com/sites/hughes.com/files/2017-04/JUPITER-System_Bandwidth-Efficiency_H55626_HR.pdf>, 7 pages.

telesat.com [online] "Briefing on Adaptive Coding and Modulation," Sep. 2010, retrieved on Jul. 6, 2023, retrieved from URL <https://www.telesat.com/sites/default/files/telesat/files/whitepapers/ACM.pdf> , 5 pages.

wikipedia.com [online], "Amplitude and phase-shift keying," Oct. 11, 2007, retrieved on Jul. 6, 2023, retrieved from URL<https://en.wikipedia.org/wiki/Amplitude_and_phase-shift_keying>, 2 pages.

wikipedia.com [online], "Circular polarization," Feb. 25, 2002, retrieved on Jul. 6, 2023, retrieved from URL<https://en.wikipedia.org/wiki/Circular_polarization>, 14 pages.

wikipedia.com [online], "Modulation," Dec. 2, 2001, retrieved on Jul. 6, 2023, retrieved from URL<https://en.wikipedia.org/wiki/Modulation>, 9 pages.

wikipedia.com [online], "Phase-shift keying," Feb. 25, 2002, retrieved on Jul. 6, 2023, retrieved from URL<https://en.wikipedia.org/wiki/Phase-shift_keying>, 17 pages.

wikipedia.com [online], "Polarization-division multiplexing, " Jun. 25, 2012, retrieved on Jul. 6, 2023, retrieved from URL<https://en.wikipedia.org/wiki/Polarization-division_multiplexing>, 4 pages.

International Search Report and Written Opinion in International Appln. No. PCT/US2023/086065, mailed on May 16, 2024, 12 pages.

\* cited by examiner

WIRELESS COMMUNICATION MODULATION USING ELECTROMAGNETIC POLARIZATION

TECHNICAL FIELD

This specification relates generally to communication systems, including systems that perform modulation that includes dynamically adjusting electromagnetic polarization used for transmissions over wireless communication channels.

BACKGROUND

Satellite communication systems often attempt to operate with high efficiency. It often is desirable to maximize the throughput that can be provided within the limited frequency bands available. In many communication systems, different signal modulation schemes (e.g., binary phase shift keying (BPSK), quadrature amplitude modulation (QAM), quadrature phase shift keying (QPSK), etc.) are available, and different modulations have different properties. For example, different modulation schemes provide different levels of throughput (e.g., different numbers of bits per symbol) but also have different minimum levels of signal quality (e.g., different minimum signal-to-noise ratio (SNR) thresholds) to allow reception. Wireless communication systems often attempt to modulate signals with the highest throughput that conditions allow.

SUMMARY

In some implementations, a wireless communication system can modulate signals with a modulation scheme that dynamically changes the electromagnetic polarization used to transmit signals. In addition to modulating information onto a carrier wave, the system can also encode information in the electromagnetic polarizations used to transmit different portions of a transmission to a receiver. A transmitter can select the polarization to use for each symbol to be transmitted, and the selected polarization modulates or encodes information conveyed to the receiver.

For example, the transmitter may use a modulation scheme of QPSK, which transmits 2 bits per symbol. In addition to the modulation of the radiofrequency carrier, the transmitter can select a polarization for each symbol from among at least two different options (e.g., horizontal polarization and vertical polarization) to set the value of an additional bit of information. In other words, the choice of polarization used for transmission provides another variable or dimension that provides another bit per symbol to whichever carrier modulation scheme is used. The transmitter can switch, symbol-by-symbol, which polarization is used for transmission of the various QPSK modulated symbols. For example, symbols can be transmitted with horizontal polarization to indicate a value of "1" for the third bit, and symbols can be transmitted with vertical polarization to indicate a value of "0" for the third bit. Together, the QPSK modulation and the selection of polarization combine to transmit three bits per symbol, instead of the two bits per symbol that QPSK alone would provide.

The technique of modulating the polarization used for transmission can add an addition bit per symbol for any carrier modulation scheme, without increasing the signal-to-noise requirements for carrier modulation. In addition, varying polarization allows a higher data rate for transmission and reception than carrier modulation alone, and the higher rate can be achieved with a single transmit chain or receive chain. For example, as discussed further below, although two different polarizations are used, the hardware of a terminal or gateway can use a single modulator and upconverter for transmission or a single downconverter and demodulator for reception. This allows the variation in polarization to provide enhanced data throughput with the amount of radiofrequency hardware usually used for a single polarization or single radiofrequency channel.

In general, by adding variation of the polarization used as a dimension for modulation, the system can add an additional bit per symbol for any modulation scheme. This allows the communication system to modulate a carrier with the most efficient modulation scheme appropriate for the physical channel conditions, and further increase the throughput by an additional bit per symbol due to the information carried in the selection of polarization. The receiver can detect the polarization used and can decode the bit encoded in the polarization as well as decode the bit(s) modulated onto the carrier (e.g., as a transmitted symbol in a constellation).

As used below, polarization of a signal refers to the orientation of electromagnetic wave oscillation propagating from a transmitting antenna. Examples include horizontal polarization and vertical polarization, as well as right-hand circular polarization (RHCP) and left-hand circular polarization (LHCP) or slant polarizations (e.g., −45° slant and +45° slant). For example, the system can increase its throughput by varying the electromagnetic polarization used for transmission, where the polarization itself carries one or more bits of information. For example, setting a specific electromagnetic polarization of the transmitting antenna, the system can encode additional data (e.g., a bit) that is transmitted. In this manner, the system can increase its throughput on the communication link because an additional bit, symbol, or other data type can be specified by the transmitter through the selection of electromagnetic polarization used for transmission. The electromagnetic polarizations can include, for example, linear polarization, circular polarization, or other types of polarization.

The system can vary the electromagnetic polarization from one transmitted symbol to the next, as needed, to convey the desired information. For example, at a first time, the system can transmit a symbol representing one or more bits with a first electromagnetic polarization to convey an additional bit (e.g., a value of "1"). At a second time, such as at the next symbol period, the system can transmit another symbol representing one or more bits with a second electromagnetic polarization to convey an additional bit with a different value (e.g., a value of "0"). Dynamically adjusting the electromagnetic polarization used for transmission thus increases the amount of data that can be sent by the transmitter compared to consistent use of only a single polarization.

In some implementations, the system can include a transmitter that transmits data with a modulation that includes varying the electromagnetic polarizations used for transmission. For example, the transmitter can receive a digital input data stream to transmit over the communication link. The transmitter can transmit segments of the data stream, where each segment has first bits modulated into the transmitted symbol and one or more second bits of the segment used to set the polarization used to transmit the symbol. The transmitter modulates the first bits onto the carrier as an appropriate symbol and transmits the symbol polarized according to the selected polarization selected based on the second bits.

In some implementations, the transmitter can include a switch that is operated to selectively switch transmission between the different electromagnetic polarizations. For example, the transmitter may have two antenna feeds, one for each of two different orthogonal polarizations. The switch can be set, on a symbol-by-symbol basis, to direct each symbol to the appropriate antenna feed that will provide the needed polarization to add the additional bit of information that is encoded with polarization selection.

In some implementations, a receiver is configured to decode or demodulate transmissions made using a combination of carrier modulation and polarization modulation. For example, the receiver can include different antenna feeds that respectively receive signals with different electromagnetic polarizations. The receiver can be configured to detect which of multiple polarizations was used, based on which of the different antenna feeds includes a received symbol. From the polarization detected (e.g., horizontal polarization vs. vertical polarization), the receiver can extract the information encoded into the polarization selection. The receiver can also demodulate the transmitted symbol itself, from whichever polarization was used. Together, the bit extracted from the polarization detected and the bits extracted from the transmitted symbol itself are combined into the received data stream.

The receiver can use various techniques to detect which of multiple polarizations is carried a transmitted symbol for a given time period. For example, the receiver can include a polarization demodulator module that can analyze, for example, the individual power or energy characteristics of the signals received for individual polarizations, and can compare the signal characteristics between different polarizations. Additional techniques for detecting transmitted symbols are described below.

In some implementations, the receiver can then perform additional processes to demodulate the transmitted symbols from received signals, from any of the multiple polarizations used. For example, the receiver can start with separate antenna feeds that provide distinct input signals for each polarization. The receiver can then combine the signals from the different antenna feeds using a signal combiner (e.g., a power combiner or signal adder) to sum the signals, then perform demodulation on the combined signals. As another option, the receiver can select which of the antenna feeds received a transmitted symbol, and demodulate the signals from the selected antenna feed. Once the symbol has been demodulated, the demodulated bits are concatenated with the bit demodulated from the polarization detected, and the combined set of bits is provided as output through an output interface.

The combination of carrier modulation and polarization modulation can be used by transmitters and receivers in a satellite communication system. The satellite communication system can include multiple terminals, a gateway system, and one or more satellites that can relay communications between the terminals and the gateway system. The terminals can each provide network service to one or more devices, e.g., cell phones, laptop computers, desktop devices, etc., that can request or provide data, and the terminals then exchange data with the gateway system via the satellite. The gateway system, in turn, is connected to a wide area network such as the Internet.

For example, terminals can transmit and receive data over the satellite network connection using a multi-frequency Time Division Multiple Access (TDMA) communication scheme. The TDMA communication scheme can divide periods of time into frames, each of which is composed of time slots. A frame is a standard unit of time for distributing bandwidth in distinct time slots among terminals. Each frame can be divided into an integral number of slots and each slot can have a duration representing a predetermined length in symbols. Additionally the TDMA scheme allows multiple terminals in the satellite communication system to share the same channel frequency bandwidth, with the terminals taking turns and transmitting and receiving in the time slots that they are respectively assigned.

The gateway system can specify one or more burst assignments allocated for terminals to transmit data. A burst assignment can include an integer number of slots, e.g., a set of one or more contiguous time slots. Within the time of each allocated burst assignment, e.g., assign time slot or slots, a terminal can transmit a terminal data burst, e.g., a data burst. The system described herein can improve the throughput available to a terminal and achievable with a single hardware radiofrequency chain, by enhancing the amount of data that can be transmitted or received for each symbol. Given the carrier encoding with the highest bit density allowable for the channel conditions (e.g., noise, interference, power limits, etc.), the addition of polarization modulation can provide at least one additional bit per symbol of throughput.

In some implementations, a communication device includes: a transmitter configured to encode data to transmit using a combination of (i) modulation of a radiofrequency carrier signal and (ii) variation of a polarization with which the modulated signal is transmitted, wherein the transmitter comprises: an input interface to receive input data for transmission; a first antenna feed to receive signals for transmission with a first polarization; a second antenna feed to receive signals for transmission with a second polarization; a modulator configured to generate modulated output that encodes a first subset of the input data according to a modulation scheme; an upconverter configured to upconvert the modulated output of the modulator to generate upconverted output; and a switch configured to selectively provide the upconverted output to the antenna feeds, wherein the switch is controlled to select between the first antenna feed and the second antenna feed such that the selection encodes a second subset of the input data in the polarization with which the upconverted output is transmitted.

In some implementations, the communication device is a very small aperture terminal (VSAT) for a satellite communication system.

In some implementations, the communication device includes a switch controller synchronized with the modulator, wherein the switch controller is configured to, for each symbol of multiple symbols transmitted: receive a bit from the second subset of the input data; and set the switch to select between the first antenna feed and the second antenna feed based on the received bit.

In some implementations, the modulation scheme encodes n bits per symbol, and the selection of polarization encodes one bit per symbol, such that each transmitted symbol encodes n+1 bits of information.

In some implementations, the modulation scheme encodes n bits per symbol, wherein the input data is a bitstream and the first subset and the second subset are extracted from the bitstream, and wherein the second subset of the input data comprises bits of the bitstream occurring after every n bits in the bitstream.

In some implementations, the switch is a single-pole double-throw (SPDT) switch implemented using a gallium arsenide semiconductor chip.

In some implementations, the modulator encodes data in symbols using the modulation scheme, and wherein the communication device is configured to use the switch to select from among the polarizations for each symbol.

In some implementations, the first polarization and the second polarization are orthogonal.

In some implementations, the first polarization is horizontal polarization and the second polarization is vertical polarization.

In some implementations, the first polarization is right-hand circular polarization (RHCP) and the second polarization is left-hand circular polarization (LHCP).

In some implementations, the communication device is configured to operate the modulator using any of multiple modulation schemes, and wherein the communication device is configured to encode an additional bit per symbol for each of the multiple modulation schemes through the polarization for transmission of each symbol.

In some implementations, the communication device is configured to use a single RF transmit chain to transmit the input data, wherein the single RF transmit chain includes the modulator and upconverter and does not include any other modulators or upconverters.

In some implementations, the communication device comprises a receiver configured to receive data over a wireless communication channel having data transmitted through a combination of (i) modulation of a radiofrequency carrier signal and (ii) variation of polarizations used to transmit the modulated signals, wherein the receiver.

In some implementations, the receiver includes: a first input line to receive signals transmitted with the first polarization; a second input line to receive signals transmitted with the second polarization; a polarization demodulator configured to (i) determine whether the first input line or the second input line receives transmitted signals, and (ii) extract transmitted data based on which of the input lines carries transmitted signals; a downconverter configured to downconvert received signals to generate the downconverted output; a demodulator configured to generate an output data by decoding the downconverted output according to a modulation scheme; a data combiner configured to combine the output bit stream with the data representative of the identified polarization type from the polarization demodulator; and an output interface to provide the combined output bit stream with the data representative of the identified polarization type for output.

In some implementations, the first input line is an antenna feed coupled to an antenna configured to receive signals with the first polarization, and the second input line is an antenna feed coupled to an antenna configured to receive signals with the second polarization.

In some implementations, the receiver comprises a signal combiner configured to generate a combined signal sum together (i) signals from the first input line that were transmitted with the first polarization and (ii) signals from the second input line that were transmitted with the second polarization; and the downconverter is arranged to downconvert the combined signal.

In some implementations, the receiver comprises a radiofrequency multiplexer configured to (i) receive signals from the first input line and signals from the second input line and to (ii) selectively pass signals from only one of the input lines at a time based on output of the polarization decoder; and the downconverter is arranged to downconvert the output of the radiofrequency multiplexer signal.

In some implementations, the data combiner is configured to interleave bits extracted based on the identified polarization of received transmissions with bits decoded based on the demodulation of symbols transmitted according to the modulation scheme.

In some implementations, the polarization demodulator is configured to: receive (i) first signals from the first input line that were received with an antenna for the first polarization and (ii) signals from the second input line that were received with an antenna for the second polarization; determine characteristics of the first signals and characteristics of the second signals; compare the characteristics of the first signals and the characteristics of the second signals; identify which of the first polarization and second polarization was used to transmit a received symbol based on the comparison of the characteristics of the first signals and the second signals; and provide a received data bit determined based on the identified polarization type.

In some implementations, the receiver further comprises a signal combiner, and the signal combiner is configured to: generate a combined signal by summing (i) the received signals from the first input line that were received with an antenna for the first polarization and (ii) the received signals from the second input line that were received with an antenna for the second polarization; and output the combined signal to the downconverter.

In some implementations, the receiver further comprises a multiplexer configured to selectively provide, to the downconverter, (i) first received signals from the first input line or (i) second received signals from the second input line, wherein the multiplexer is controlled to select between the first received signals and the second received signals based on data representative of an identified polarization type determined by the polarization demodulator. The multiplexer can be controlled to select between the first received signals and the second received signals for each symbol period.

In some implementations, the polarization demodulator determines, for each symbol period, whether a signals indicative of a transmission are received for each of the first polarization and second polarization.

In another general aspect, a method performed by a communication device includes: receiving, by the communication device, input data to transmit over a wireless communication channel, wherein the communication device has a (i) first antenna feed to receive signals for transmission with a first polarization and (ii) a second antenna feed to receive signals for transmission with a second polarization; modulating, by the communication device, a radiofrequency carrier to generate modulated output that encodes a first subset of the input data according to a modulation scheme; upconverting, by the communication device, the modulated output of the modulator to generate upconverted output; and varying, by the communication device, a polarization with which the upconverted output is transmitted based on a second subset of the input data, such that the input data is transmitted using a combination of (i) modulation of the radiofrequency carrier signal and (ii) variation of the polarization with which the modulated signal is transmitted.

In some implementations, varying the polarization with which the upconverted output is transmitted comprises controlling, by the communication device, a switch to select between the first antenna feed and the second antenna feed such that the selection encodes the second subset of the input data in the polarizations selected for different portions of the upconverted output.

In some implementations, controlling the switch to select between the first antenna feed and the second antenna feed comprises: for each symbol of multiple symbols transmitted:

receiving a bit from the second subset of the input data; setting the switch to select between the first antenna feed and the second antenna feed based on the received bit; and transmitting the symbol that encodes one or more bits of the first subset of the input data on the antenna feed selected based on the received bit of the second subset of the input data.

In some implementations, the method includes: receiving (i) first signals having the first polarization and (ii) second signals having the second polarization; and obtaining a data stream transmitted using the first signals and the second symbols, including by, for each of multiple symbol periods: determining, from among the first polarization and the second polarization, which polarization was used to transmit a symbol for the symbol period; identifying a first bit of information of the data stream based on the determined polarization used to transmit the symbol for the symbol period; demodulating a modulated signal for the symbol period to identify one or more second bits of information of the data stream, wherein the modulated symbol comprises: a summation of (i) signals received for the symbol period for the first polarization and (ii) signals received for the symbol period for the second polarization; or signals received for the symbol period from a single one of the first polarization and second polarization; and including the first bit of information and the one or more second bits of information in the data stream.

In another general aspect, a method performed by communication device includes: receiving (i) first signals having the first polarization and (ii) second signals having the second polarization; and obtaining a data stream transmitted using the first signals and the second symbols, including by, for each of multiple symbol periods: determining, from among the first polarization and the second polarization, which polarization was used to transmit a symbol for the symbol period; identifying a first bit of information of the data stream based on the determined polarization used to transmit the symbol for the symbol period; demodulating a modulated signal for the symbol period to identify one or more second bits of information of the data stream, wherein the modulated symbol comprises: a summation of (i) signals received for the symbol period for the first polarization and (ii) signals received for the symbol period for the second polarization; or signals received for the symbol period from a single one of the first polarization and second polarization; and including the first bit of information and the one or more second bits of information in the data stream.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
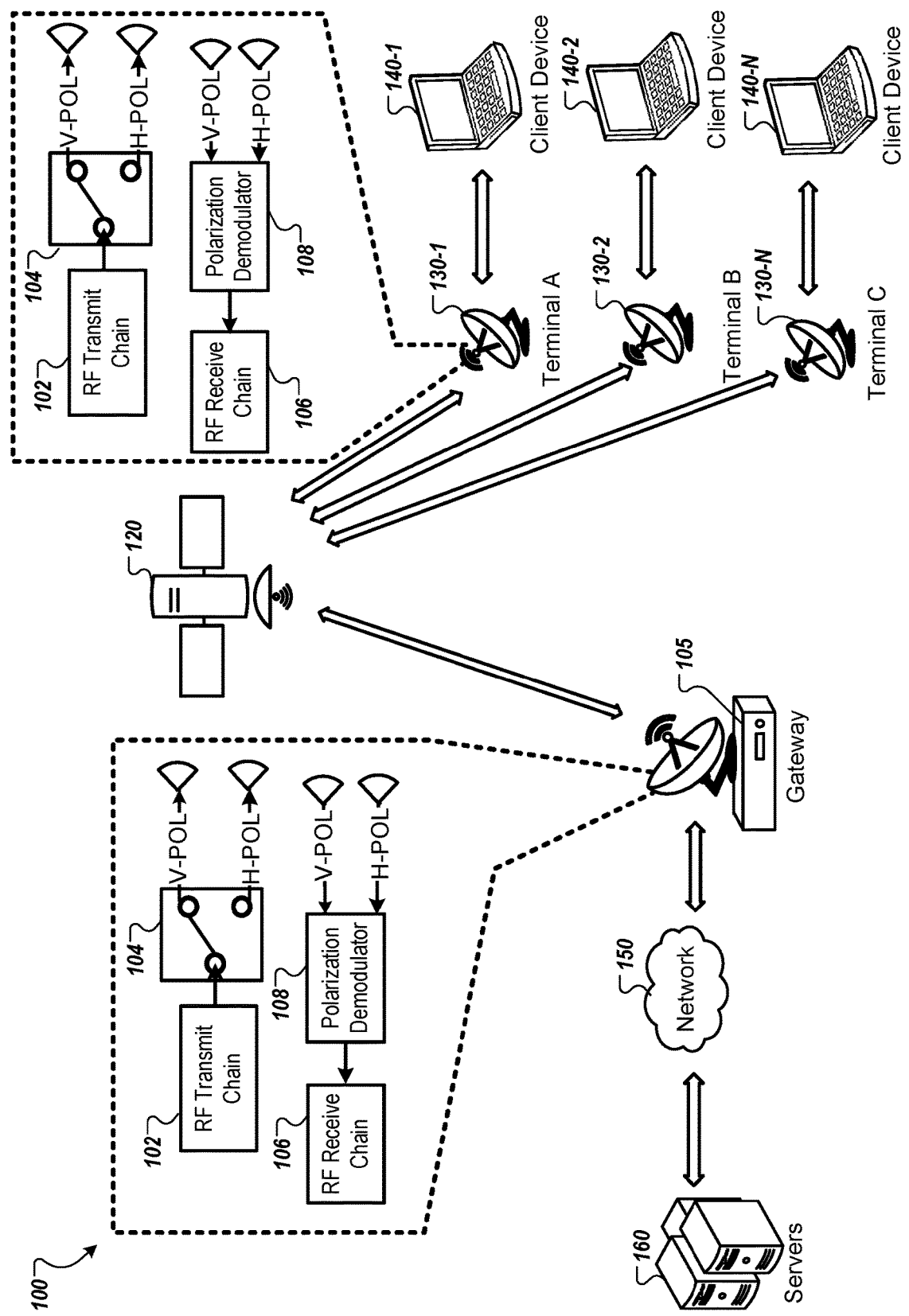
FIG. 1 is a diagram showing an example of a system for wireless transmission and reception using carrier modulation and adjustment of electromagnetic polarization.

FIG. 1 is a diagram showing an example of a system 100 for wireless communication using carrier modulation and adjustment of electromagnetic polarization. The example of FIG. 1 shows a satellite communication system, but the techniques described here can be used in other wireless communication systems. The system 100 includes a gateway system 105 that communicates with a satellite 120, and the satellite 120 communicates with various satellite terminals 130-1 through 130-N (collectively "terminals 130"). The satellite 120 and the gateway system 105 (along with other network components, can cooperate to transfer data to and from the terminals 130 to one or more servers 160 over network 150. The network 150 can include, for example, a core network, the Internet, a cellular network, or another type of communication medium. The servers 160 can include one or more servers or one or more computers, such as third party systems that communicate over the Internet.

Each of the terminals 130 can be in communication with and provide network service to one or more client devices 140, such as hand-held devices, telephones, laptop computers, desktop computers, Internet of Things (IOT) devices. The client devices 140 make use of the network connections provided by the terminals 130, the satellite 120, and the gateway system 105. For example, as illustrated in system 100, terminal 130-1 communicates with client device 140-1, terminal 130-2 communicates with client device 140-2, and terminal 130-N communicates with client device 140-N. Each of the terminals 130 may communicate with more than one client device 140.

In some implementations, the terminals 130, the satellite 120, and the gateway system 105 can communicate over a particular communication scheme. For example, these components can communicate using a Time Division Multiple Access (TDMA) communication scheme. The gateway system 105 can allocate slots in TDMA frames to each of the terminals 130 for communicating over the connection with the satellite 120. For example, the gateway system 105's allocation of data transfer bandwidth can include multiple slots in the TDMA communication scheme for each terminal to send and/or receive data. For example, the gateway system 105 can make burst assignments that each include a starting slot number and a length of number of slots. In the TDMA scheme, the terminals 130 can share the same channel frequency but communicate in different time slots on that channel frequency to avoid collisions with one another.

The TDMA frame structure can be constructed of a set number of frames N. In the TDMA frame structure, a frame can represent a standard unit time period for distributing bandwidth in distinct time slots among each of the terminals 130. For example, the duration of one frame can be fixed to a time length of 45 milliseconds (ms) and each can be divided into an integral number of slots. The length of each slot can be 120 symbols, for example. The gateway system 105 can dictate the length of each frame and the integral number of slots that compose each frame.

The TDMA arrangement can also organize frames into superframes. For example, a superframe can be represented as a collection of eight frames or another predetermined number of multiple frames. The time length of the superframe is equivalent to 360 ms or 8 frames multiplied by 45 ms per frame. The burst length in symbols for any of the terminals 130 can be calculated by multiplying the number of slots in that burst by 120 symbols. Moreover, the number of symbols in a frame and the number of slots in the frame can also vary. The slot duration in time can also vary depending on the transmission symbol rate from either the terminals 130 or the gateway system 105. For example, table 1 illustrated below shows different various of the symbol rate, slots per frame, and the slot time in microseconds (μs).

TABLE 1

Examples of Symbol rate, Slots/Frame, and Slot Duration

| Symbol Rate (MSPS) | Slots/Frame | Slot Duration (μsec) |
|---|---|---|
| 0.128 | 48 | 937.5 |
| 0.256 | 96 | 468.75 |
| 0.512 | 192 | 234.375 |
| 1.024 | 384 | 117.1875 |
| 2.048 | 768 | 58.59375 |
| 4.096 | 1536 | 29.296875 |
| 6.144 | 2304 | 19.53125 |
| 8.192 | 3072 | 14.6484375 |
| 12.288 | 4608 | 9.765625 |
| 16.384 | 6144 | 7.32421875 |
| 24.576 | 9216 | 4.8828125 |

In some implementations, each of the terminals 130 can transmit their transmissions according to the gateway system 105's allocations. For example, the terminals 102 can time transmission of their terminal data bursts to coincide with their allocated burst assignments, as designated by the gateway system 105. A terminal can be assigned multiple bursts within the same frame. A terminal can be assigned multiple bursts across multiple frames. As mentioned, the number of slots within a frame can vary depending on the transmission symbol rate, which is illustrated in Table 1 shown above. For example, a frame can have 96 slots, 192 slots, 384 slots, 768 slots, and so on, based on the designated symbol rate in Megasymbols per second (MSPS). Additionally, a terminal data burst can span multiple slots in a specific frame. For example, a terminal data burst can span one, three, five, or fifteen slots in a frame.

In some implementations, the terminals 130 can send various data types to the gateway system 105 over the satellite 120. For example, a terminal, e.g., terminal 130-1, can transmit a terminal data burst during the allocated time slot identified by the gateway system 105. The terminal data burst can include payload data such as, for example, text, video data, audio data, image data, and other data. The terminal data burst can also include control information to aid the gateway system 105 in detecting the transmitted terminal data burst. The terminal data burst can also include buffer periods at the beginning of each terminal data burst, to signal to the gateway system 105 separate and subsequent terminal data bursts. The terminal 130 can use allocated slots to stream data to and from its respective client device(s) 140 over the satellite 120, and do the same for multiple connected client devices. In this manner, the terminal 130 can service multiple connected client devices and meet their network transfer demands. Transmissions by a terminal 130 are limited to the amount of data bandwidth allocated to it. This specific amount of data bandwidth is set and a terminal can transmit a set amount of data within the constraints of the allocation.

A terminal 130 may perform various processes to prepare data to be transmitted from a transmitting antenna to the gateway system 105 over the satellite 120. For example, the terminal 130 can perform processes that include, for example, forward error correction (FEC) on the data to be transmitted. Transmission can include mapping the FEC-encoded bits to one or more symbols according to a desired modulation scheme, pulse shaping or filtering with pre-compensation techniques to adjust the symbols to be transmitted, upconverting these symbols to a desired carrier frequency, controlling gain of the analog signals for output, and transmitting the amplified signals via the transmitting antenna.

In most conventional modulation schemes, the data to be transmitted is indicated by the symbol transmitted, e.g., the modulation of a carrier. However, the system 100 also enables additional data to be transmitted through the polarization used to transmit the symbol. Thus, in addition to the symbol transmitted, additional data can be encoded or modulated into the polarization selected for transmitting the symbol. The receiver can monitor each of the potential polarizations that may be used, and can decode the additional data based on identifying which of the potential polarization was used to transmit the symbol Transmitters can use any of various modulation schemes to modulate a carrier to transmit data. These modulation schemes include, for example, Binary Phase Shift Keying (BPSK), Offset Quadrature Phase Shift Keying (OQPSK), Quadrature Phase Shift Keying (QPSK), 8-Phase Shift Keying (8-PSK), 16 Amplitude Phase Shift Keying (16-APSK), and 16 Quadrature Amplitude Modulate (16-QAM), to name some examples. For these modulation schemes, the number of bits per symbol (bps) is 1 bps for BPSK, 2 bps for OQPSK, 2 bps for QPSK, 3 bps for 8-BSK, 4 bps for 16-APSK, and 4 bps for 16-QAM.

When an antenna is installed, for a terminal 130 or the gateway system 105, various characteristics of the antenna are typically configured during installation. For example, one of the characteristics of the antenna includes the polarization of the antenna, which indicates the orientation the electromagnetic fields produced by or received by the antenna. As a result, The terminals 130 and the gateway system 105 can each include antenna sections for different polarizations, such as orthogonal pairs of polarizations. For example, the terminal 130 or the gateway system 105 can each have a bi-directional antenna that can separately transmit and/or receive signals with at least two different polarizations, such as vertical polarization and horizontal polarization. In a vertical polarization, the oscillation of an antenna's electrical field is represented on a vertical plane. In a horizontal polarization, the oscillation of an antenna's electrical field is represented on a horizontal plane. Similarly, an antenna can be configured to transmit and/or receive with other polarizations such as, for example, slant polarizations (e.g., +45° and −45°), circular polarizations (e.g., right-hand circular polarization (RHCP) and left-hand circular polarization (LHCP)), and elliptical polarizations, to name some examples. Antennas can be configured to allow both transmit and receive capabilities. These capabilities can include transmitting and receiving on both horizontal polarizations and vertical polarizations, to name some examples.

The satellite 120 can include capabilities of each of the different transmit and receive polarizations. For example, the satellite 120 may include one or more antenna that can communicate bi-directionally with each of the terminals 130 and the gateway system 105. In order to fulfill the communication criteria for each terminal and the gateway system 105, the satellite 120 can include one or more antennae that can communicate, e.g., transmit and receive, using each of the different polarizations utilized by the terminals 130 and the gateway system 105.

To improve communication throughput, the terminals 130 and/or the gateway system 105 can be configured to transmit information using a combination of RF carrier modulation and a selection of the polarization used for transmission. Data can be modulated onto a carrier by selecting a symbol to transmit, and a selection between different polarization options for transmitting the symbol can carry additional data. For example, the system 100 use a specific electromagnetic polarization to encode a specific data bit. This increases the amount of data sent over the satellite communication link, because the transmission of each symbol also carries an additional bit specified through the polarization used for transmission of that symbol.

For example, and described below, the terminal 130-1 can receive a data steam to transmit, and can segment the data stream into one or more data segments (e.g., segments of three bits each). The transmitter can extract a component from that data segment, e.g., one bit, and encode that bit through the selection of a polarization to be used for transmission. The remainder of the data segment (e.g., the remaining two bits) are transmitted through modulation of the carrier using an appropriate symbol. As a result, transmitting the symbol on the selected polarization carries three bits of information, even though the symbol itself only carries 2 bits of information. In this arrangement, the transmitter can switch between two orthogonal polarizations (e.g., vertical polarization and horizontal polarization) to specify different bit values.

The communication channel can use a single carrier (e.g., a same carrier of 40 GHz for both polarizations) and can be considered to include both polarizations. By contrast with systems that use different polarizations as separate channels, the system 100 uses only one of the polarizations at a time. In other words, if a symbol is transmitted on the carrier with vertical polarization, no symbol is simultaneously transmitted on the horizontal polarization. This leaves some spectrum bandwidth unused (e.g., only one of the two polarizations is used at a time), but allows for increased throughput with minimal hardware requirements. As discussed below, the present techniques allow a transmitter or receiver to use a single RF chain (e.g., single modulator and upconverter, or single downconverter and demodulator) and switch between the two polarizations, allowing for higher throughput than a single RF chain would otherwise allow. Using two polarizations simultaneously (e.g., in full channel bonding with different polarizations as independent channels) would require two RF receive chains which would significantly increase the hardware requirements for terminals.

In effect, the system 100 can take advantage of the polarization of the propagating wave to encode additional data to be transmitted. The system can use polarization or wave orientation as a usable attribute that may be modulated along with modulation of amplitude, frequency, and phase in wireless communications. As will be described below, when the receiver receives the propagated wave, the receiver can extract the polarization-encoded information based on a detected type of polarization of the propagated wave and combine the extracted information with the demodulated symbol to produce the bits that were originally transmitted.

As illustrated in system 100, the gateway system 105 and each of the terminals 130 can include various components that enable transmission and reception. For example, the gateway system 105 and the terminals 130 can each include a transmitter including a radio frequency (RF) transmit chain 102 that performs modulation and upconversion to prepare a symbol for transmission. The transmitter can also have a corresponding switch 104 that selects between two different antenna feeds that are respectively connected to antenna sections (referred to as "RF transmit set") that transmit with different polarizations (e.g., V-POL and H-POL). For example, the switch 104 can route the signals for a symbol to be transmitted with a horizontal polarization antenna or a vertical polarization antenna.

The gateway system 105 and the terminals 130 can each include a receiver including a RF receive chain 106 that downconverts and demodulates signals either of two antenna sections (referred to as "RF receive set") for different polarizations (e.g., V-POL and H-POL). The receiver also includes a polarization demodulator 108 that analyzes received signals from the antenna feeds of each of the different polarizations, to determine which polarization was used to transmit a symbol and thus the value of the polarization-encoded bit.

In some implementations, the gateway system 105 may include multiple antennas, as well as multiple transmitters and receivers for each antenna to concurrently handle communications on different channels or carriers.

In some implementations, the RF transmit chain 102 can include components that can receive input data and output waveforms for wireless symbols to the switch 104. The components can include, for example, an input interface, a data router, one or more source encoders, one more channel encoders, a modulator, one or more pulse shape filters, an intermediate frequency filter, one or more upconverters, and one or more digital to analog converters. The RF transmit chain 102 may include other components used to output the data symbols to be transmitted by the transmitting antenna. In some implementations, a device such as a terminal 130 includes only a single RF transmit chain, which includes only a single modulator and a single upconverter.

In some implementations, the RF receive chain 106 can include components that can receive signals received from antennas for different polarizations, process sets of signals, and output the data that is demodulated. For example, the RF receive chain 106 can include a downconverter, an intermediate frequency filter, one or more pulse shaping filters, one or more demodulators, one or more channel decoders, one or more source decoders, a baseband filter, one or more analog to digital converters, a combiner, and an output interface.

The RF receive chain 106 may include other components used to process the signals received by the different electromagnetic polarization antennae. The description of these components will be further described below.

As discussed further below, the polarization demodulator 108 can receive signals from the antenna portions with different polarizations, e.g., signals from a vertical polarization antenna and signals from a horizontal polarization antenna. The polarization demodulator 108 can analyze the received sets of signals and determine which polarization includes a transmitted symbol. In the example of system 100, the polarization demodulator 108 can analyze received signals from a vertical polarization antenna and analyze received signals from the horizontal polarization antenna to determine which of the polarizations, if any, was used to transmit a symbol.

The polarization demodulator 108 can generate output that identifies which of the polarizations was used for a received symbol. Based on the identified polarization (e.g., which of the antenna feeds for different polarizations carried the received symbol), the polarization demodulator can also demodulate or identify the bit modulated through the polarization selection. To obtain the full data stream, for each received symbol the receiver combines the (i) the data demodulated from the symbol using the RF receive chain 106 and (ii) the bit identified by the polarization demodulator 108 from the identified polarization used.

Figure 2:
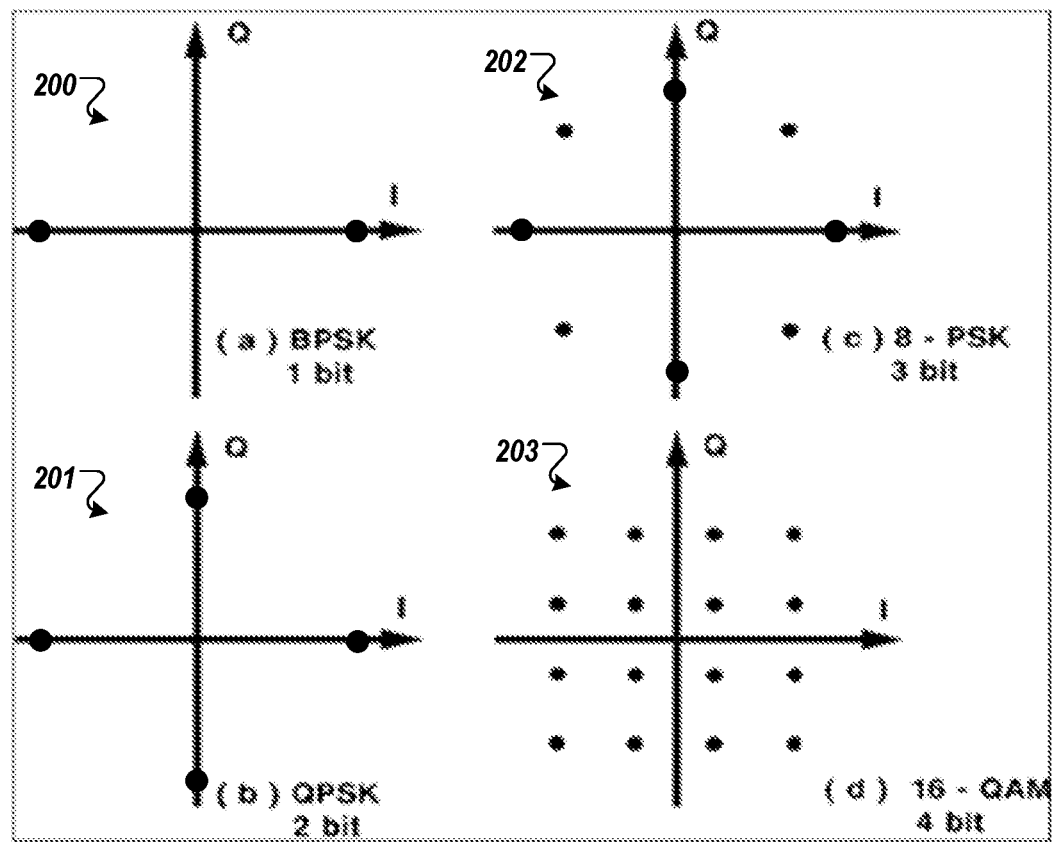
FIG. 2 is a diagram showing an example of carrier modulation schemes used for data transmission.

FIG. 2 is a diagram showing constellation diagrams providing examples of modulation schemes 200-203 that can be used for data transmission by the terminals 130 and the gateway system 105. For example, the modulation schemes include BPSK 200, QPSK 201, 8-PSK 202, and 16-QAM 203, and an in-phase and quadrature diagram is provided for each. Other modulation schemes not illustrated can also be used.

As illustrated in FIG. 2, BPSK 200 has two possible symbols and transmits one bit per symbol. QPSK 201 has four symbols and transmits two bits per symbol. 8-PSK 202 has eight symbols and transmits three bits per symbol. 16-QAM 203 has sixteen symbols and transmits four bits per symbol. The terminals 130 and gateway system 105 can select one or more of the modulation schemes 200 for modulating data to be transmitted over the terminal data bursts, as shown in system 100. The modulation scheme can be changed from time to time to account for changes in wireless channel conditions (e.g., noise, interference, etc.) and to provide desired levels of throughput and reliability.

Typical carrier modulation of electromagnetic (EM) signals can rely on the tuning of various physical properties of a periodic waveform. For example, the harmonic motion of a waveform can be expressed according to equation 1 shown below:

$$y(t) = A\sin(2\pi f t + \varphi) \quad (1)$$

As illustrated in equation (1) above, y(t) is the amplitude of the signal at any given point in time t, and A, f, and φ refer to the applied amplitude, frequency, and phase offset of the signal, respectively. These variables represent the characteristics that can be tweaked for a periodic signal or continuous wave (CW) for encoding information. In response, the CW can be transmitted out of a transmitting antenna, such as transmitted out of a vertically polarized antenna at the terminal 130-1. Consequentially, equation 1 allows for any one of multiple modulation schemes to be used, where a combination of amplitude, frequency, and/or phase can be modulated to embed information onto a CW.

The attributes of equation 1 can be used in various digital communication systems, e.g., wireless communication systems, satellite communication systems, and others, to explore or utilize higher-density modulation schemes, such as, for example, 64-QAM, 256-QAM, or higher. Even in the higher-density modulation schemes, the aforementioned variables for waveform variation, e.g., amplitude, frequency, and phase, can be adjusted or tuned. As such, it is possible to adjust these variable to jam as much information as possible out of the available channel bandwidth. However, as higher-density modulation schemes are used, a number of constraints become more apparent, such as Signal to Noise Ratio (SNR) and a demodulator's Effective Number of Bits ($EN_oB$). When the modulation scheme increases, e.g., increases in number of bits per symbol, the SNR and the $EN_oB$ required to properly receive, demodulate, and recover the transmitted symbol, also become higher due to the proximity of similar symbols for the corresponding modulation scheme.

Figure 3:
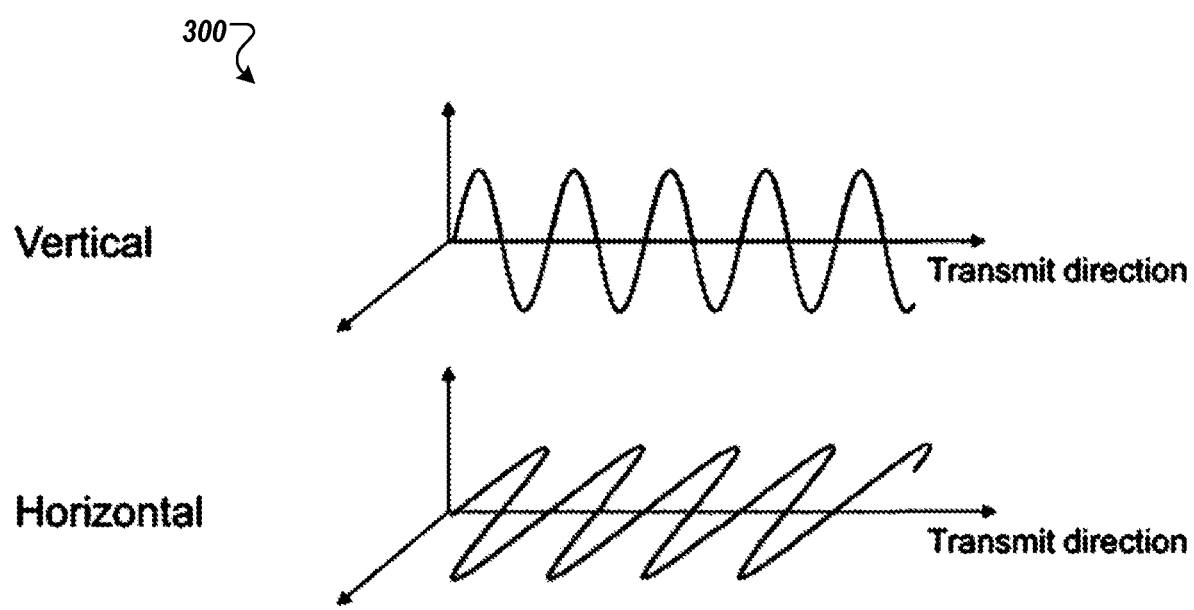
FIG. 3 is a diagram showing examples of different electromagnetic polarizations.

FIG. 3 is a diagram showing examples of different electromagnetic polarizations 300 utilized during data transmission. The electromagnetic polarizations 300 illustrate two different polarizations that can be used by the terminals 130, the satellite 120, and the gateway system 105 when transmitting and receiving terminal data bursts. The electromagnetic polarizations 300 can refer to the orientation of the wave oscillation propagating away from a transmitting antenna (or propagating towards a receiving antenna). As illustrated in FIG. 3, the electromagnetic polarizations 300 can include a vertical polarization and a horizontal polarization, both types of linear polarization. The terminals 130, the satellite 120, and the gateway system 105 can also communicate using other types of polarization, such as circular polarization.

Figure 4:
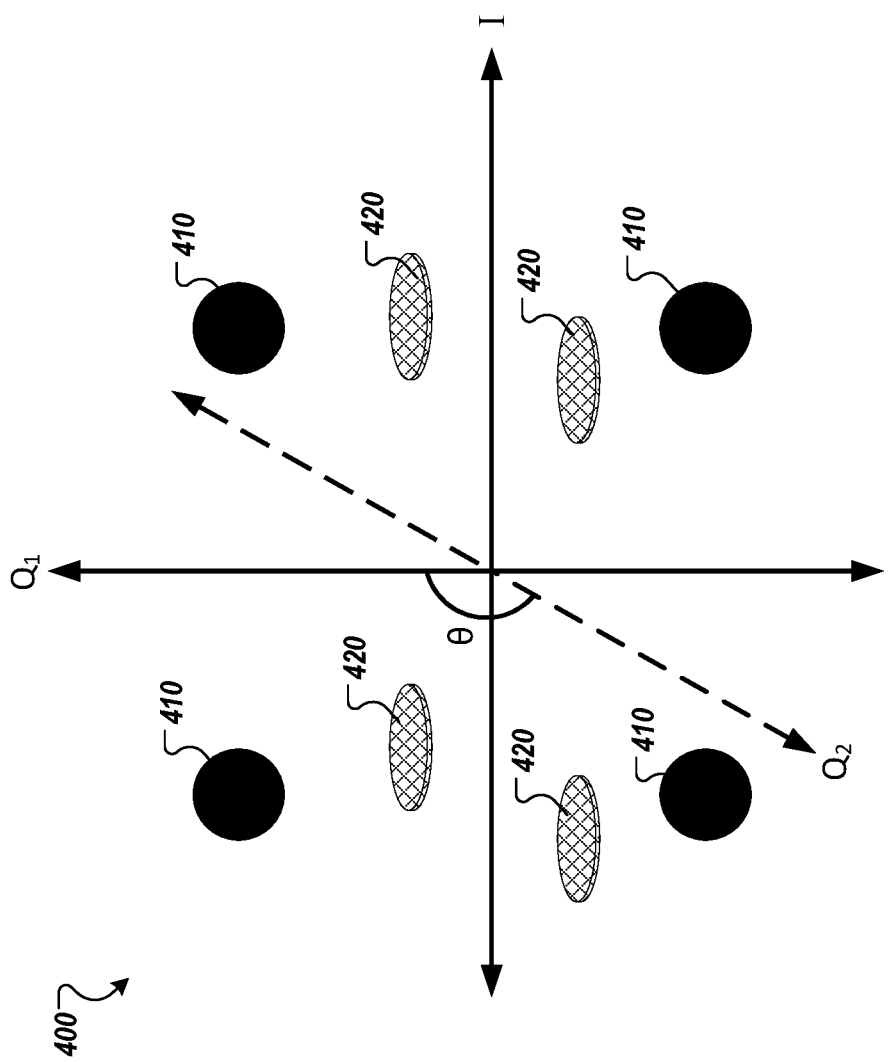
FIG. 4 is a diagram showing an example of a three-dimensional in-phase and quadrature constellation diagram for a modulation scheme having carrier modulation and polarization modulation aspects.

FIG. 4 is a diagram showing an example of a three-dimensional in-phase and quadrature (IQ) constellation diagram 400 for a modulation scheme. For example, the I-Q constellation diagram 400 represents a QPSK constellation diagram. The solid filled circles represent the QPSK constellation diagram for a vertically polarized transmission (θ=0°). The dashed filled circles represent the QPSK constellation diagram for a horizontally polarized transmission (θ=90°).

In some implementation, the periodic motion of equation (1) above can be updated for polarization orientation of a transmission antenna. For example, equation (1) can be updated to include, for example, an angle of linear polarity, as represented by theta θ, and shown in equation (2) below.

$$y(t) = [\sin(\theta) * A\sin(2\pi f t + \varphi)]\hat{x} + [\cos(\theta) * A\sin(2\pi f t + \varphi)]\hat{y} \quad (2)$$

As illustrated in equation (2), the electromagnetic polarization of the transmitted signal, i.e., the angle of linear polarity θ, is another variable that can be modulated to embed information onto a CW to be transmitted. In this example, if a transmitter (of either a terminal 130 or gateway system 105) dynamically changes which polarization is used (e.g., by switching to route signals to antenna sections for different polarizations), another bit of information can be effectively added to the modulation scheme.

An example of the addition of a bit to the modulation scheme is shown in FIG. 4. This scheme represents the use of QPSK carrier modulation of a single carrier, but with the QPSK symbols doubled to include QPSK in a first polarization and also QPSK in a second polarization. For example, a first set of symbols 410 represent QPSK with a vertical polarization, shown in plane I-$Q_1$. A second set of symbols 420 represents QPSK with a horizontal polarization, shown in plane I-$Q_2$. This provides a QPSK modulation scheme that has orthogonal (90°) control over linearization. For example, when an additional bit is encoded into the CW according to the selected polarization scheme, QPSK can be referred to as Multiplanar-QPSK (MQPSK). In FIG. 4, the theta θ represents the polarization variable that is adjusted in a QPSK 3D constellation diagram. When the polarization modulation bit is added to the QPSK modulation scheme, a standard 2-bit QPSK modulation scheme can be represented as a 3-bit MQPSK, which represents 8 possible states for a transmitted symbol. These states can include, for example, 000, 001, 010, 011, 100, 101, 110, and 111. Each of these states can represent a symbol shown in the constellation diagram of FIG. 4. For example, the left-most bit in the sequence can be specified by the polarization used, so (1) the four symbols 410 can be used to provide states 000, 001, 010, and 011 (e.g., where vertical polarization indicates an initial bit of "0") and (2) the four symbols 420 can be used to provide states 100, 101, 110, and 111 (e.g., where horizontal polarization indicates an initial bit of "1").

This technique of adding another bit per transmitted symbol by modulating the polarization used for transmission can also be applied to other modulation schemes, e.g., 8-PSK, 16-APSK, 16-QAM, 64-QAM, 128-QAM, and so on, to increase throughput and bandwidth utilization of the satellite communication system.

Figure 5:
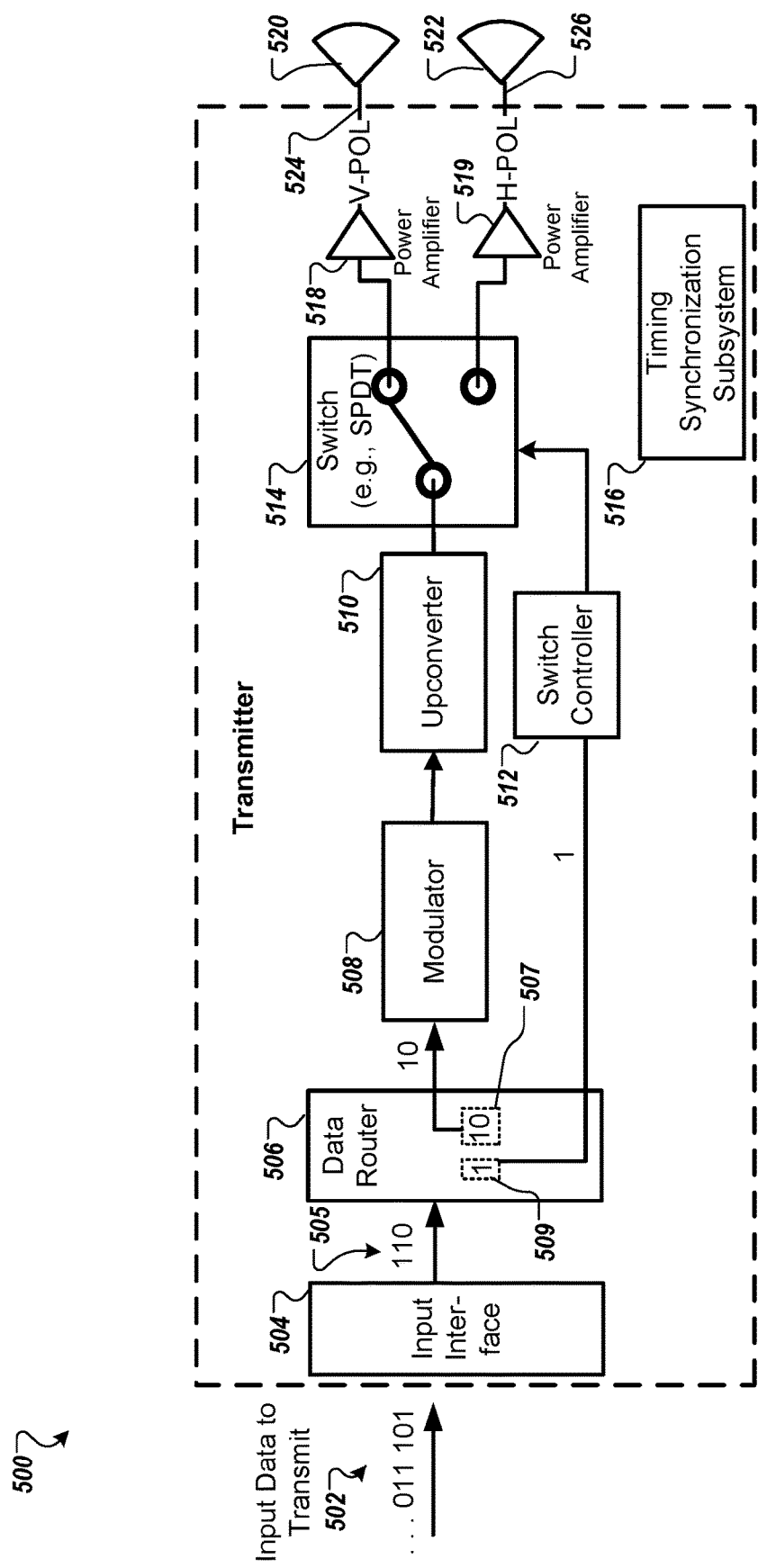
FIG. 5 is a diagram showing an example of a transmitter that can dynamically adjust electromagnetic polarization during data transmission.

FIG. 5 is a diagram showing an example of a transmitter 500 that can dynamically adjust electromagnetic polarization during data transmission. The transmitter 500 can be incorporated in both the gateway system 105 and each of the terminals 130. The transmitter 500 includes an input interface 504, a data router 506, a modulator 508, an upconverter 510, a switch controller 512, a switch 514, two power amplifiers 518, a timing synchronization subsystem 516, a vertical polarized antenna 520, and a horizontal polarized antenna 522. However, the illustrated example of transmitter 500 may also include other components such as, for example, one or more encoders, one or more pulse shape filters, an intermediate frequency filter, and one or more digital to analog converters, to name some examples. The transmitter 500 can also include other components.

The transmitter 500 can be coupled to two antennas 520, 522 that each transmit wireless signals with orthogonal polarizations. For example, the antenna 520 can be configured to transmit signals with vertical polarization, and the antenna 522 can be configured to transmit signals with horizontal polarization. Typically, the polarization of an antenna is a static physical setting and is fixed at installation time of the antenna. The receiver 500 has separate antenna feeds 524, 526 used to separately provide signals for transmission to the different antennas 520, 522.

A transmitting antenna can include two antennas 520, 522 or antenna sections that are cross-polarized and a means of switching transmissions between the two antennas. When two antennas are cross-polarized, the two antennas are said to be orthogonal to one another, e.g., separated by 90 degrees or otherwise orthogonal such as in the case of RCHP and LCHP antennas. As an example, an orthogonal pair of antennas can have one antenna oriented for horizontal polarization, and the other antenna is oriented for vertical polarization. In some implementations, a communication device such as a satellite terminal includes one pair of orthogonal antennas or antenna sections is used for transmitting, and the device includes another pair of orthogonal antennas or antenna sections for receiving. In other implementations, a device has single pair of orthogonal antennas or antenna sections used for transmitting and receiving, and the device (e.g., a terminal) can transmit and receive in different time slots.

The transmitter 500 includes an input interface 504 to receive input data 502 to transmit. The input data 502 can be in the form of bits or bytes, for example, and can represent video data, audio data, text, a request, or some other form of data. The input data 502 can be provided as a bitstream.

The transmitter can receive the input data 502 and can store the input data 502 to be retrieved by the data router 506. For example, the received input data 502 can be stored temporarily in, for example, a buffer, in cache memory, or in external memory.

The data router 506 accesses the input data 502 and routes some of the bits to be transmitted through modulation on the RF carrier, and routes other bits to be transmitted through modulation of the polarization used for transmission (e.g., selection of polarization for each transmitted symbol). The data router 506 can access the input data 502 in data segments, and for each segment, one bit is designated to be encoded in the polarization used and the other bits are designated to be encoded in the symbol transmitted on the RF carrier.

The data router 506 can access one or more data components of the input data 502 at a time, and the input interface 504 or a memory can provide the data router 506 with the requested data in a sequential and ordered fashion. The size of each data segment (e.g., the amount of bits per symbol plus one) can be set according to the modulation used. For example, for QPSK each data segment can be three bits (e.g., two bits for a QPSK symbol, and another bit transmitted through the selection of the polarization).

For each data segment processed by the data router 506, a first portion 507 is to be encoded into the transmitted symbol and a second portion 509 is used to control the switch 514 that sets which polarization will be used. For example, the data router 506 can communicate with the modulator 508 or another processor (e.g., a CPU, SoC, etc.) of the communication device to determine which modulation scheme is being used, or at least how the number of bits per symbol provided in the modulation scheme. For example, any of various modulation schemes can be used, including BPSK, 8-PSK, QPSK, 16-APSK, 16-QAM, 64-QAM, and 256-QAM. In the illustrated example, the transmitter 500 uses a QPSK modulation scheme, which transmits two bits per symbol.

The data router 506 can determine that n+1 bits are required to be retrieved from the input interface 504, where n represents the number of bits required by the modulator 508 according to the modulation scheme. The extra bit added to n represents the bit used to instruct the switch controller 512, and subsequently the switch 514. Continuing with the example from above, the data router 506 can determine that 3 bits of input data 502 are used for each symbol transmission-two bits for the QPSK modulation and one bit for selecting the polarization to use (e.g., to control the selection of the switch 514).

As another example, if the transmitter 500 uses 16-QAM as the modulation scheme, the modulator 508 or a processor of the communication device can instruct the data router 506 that four bits are transmitted for each modulated symbol. In response, the data router 506 can determine that five bits of input data 502 should be retrieved at a time to provide n+1 total bits per symbol transmission. Each symbol transmission will be transmitted is encoded with n+1 bits of information, as will be further described.

Continuing with the example shown in FIG. 5, the data router 506 extracts three bits from the input interface, e.g., two bits to be used to select a symbol for the QPSK modulation scheme and one bit to control the switch 514 to select a polarization for transmission. For example, the data router 506 may extract a data segment of three bits "110" to be processed by the remaining components of the transmitter 500. From this three-bit data segment, a first portion 507 (e.g., the two right-most bits "10") is extracted and provided to the modulator 508. A second portion 509 (e.g., the left-most bit "1") is extracted and provide to the switch controller 512 where it will set the state of the switch 514. The state of the switch 514 sets which antenna feed 524, 526 receives the symbol that represents the first portion 507, and thus which polarization is used to transmit the symbol that represents the first portion 507.

The data router 506 may sequentially process multiple data segments of the same size in the order in which they were received by the input interface 504. The number of bits per symbol of the modulation for the RF carrier determines how the data router 506 distributes the bits of the input data 502. For example, if n=2 (e.g., two bits per symbol), then every third bit will be taken out of the input data bit stream and provided to the switch controller 512 instead of being provided to the modulator 508. In other words, in a sequence of consecutive bits, bits 1 and 2 represent the bits to be modulated onto the RF carrier, and bit 3 represents the bit to be used to control the switch 514. Moreover, bits 6, 9, 12, and so on, are used to control the switch for subsequent sets of bits. As such, the switch control bits can be identified and taken out from among the other bits of the input data 512, to be used to set the polarization for transmission of the corresponding other bits represented through carrier modulation.

An implementer of transmitter 500 and a corresponding receiver can determine in advance which bit position in a sequence is used for setting the polarization instead of. For example, the implementer of the system can configure the data router 506 to use the least significant bit (LSB) from each data segment to set the polarization, or may configure the data router 506 to use the most significant bit (MSB) from each data segment to set the polarization.

As illustrated in FIG. 5, the data router 506 uses the MSB of the data segment 505 as the second portion 509 that determines the polarization to be used for transmitting the current data segment 505. The data router 506 supplies the extracted MSB, (e.g., a bit value of "1") to the switch controller 512. The data router 506 provides the remaining bits of the data segment 505 (e.g., the first portion 507) to the modulator 508. Note that the data router provides the bits "10" of the first portion 507 and does not provide the second portion 509 (e.g., the MSB of "1" from the data segment 505 of "110") that will set the polarization to be used. After routing the data for the data segment 505, the data router 506 can sequentially process and route the bits of the subsequent data segments of the input data 512 for processing.

The modulator 508 can modulate a periodic signal to encode the data of the first portion 507, e.g., the bits "10" provided by the data router 506. In the example, QPSK modulation is used, so the modulator 508 selects one of the four QPSK symbols that represents the bits "10" and creates a modulated signal representing that symbol. For example, the modulator 508 can map the received bits to a symbol in a QPSK constellation. Any appropriate modulator can be used to modulate a symbol according to the selected carrier modulation scheme.

In some implementation, the transmitter 500 can perform filtering, pulse shaping, pre-equalization, and other features to aid transmission and provide robustness to the noise of the communication channel. In response to filtering the modulated signal, the transmitter 500 can provide a modulated signal (e.g., at an intermediate frequency (IF)) to the upconverter 510. In some implementations, the upconverter 510 can convert the RF signals at low frequency to higher frequency signals. For example, the upconverter 510 can use the intermediate frequency as input and upconvert the signals at IF to a higher frequency, such as the carrier frequency that will be used to transmit the analog signal. The upconverter 510 mixes the IF signal with a local oscillator signal. The carrier frequency is the sum of the intermediate frequency and the frequency of the local oscillator signal.

Typically, in satellite communications, the carrier frequency can be within the higher microwave frequency bands. These higher frequency bands can include, for example, the X frequency band (e.g., 7-12 GHZ), the Ku frequency band (e.g., 12-18 GHZ), the K frequency band (e.g., 18-27 GHZ), the Ka frequency band (e.g., 27-40 GHz), or the V frequency band (e.g., 40-75 GHz).

The transmitter 500 selects, from among the two polarizations of the antennas 520, 522, a polarization for transmission of the modulated, upconverted signal representing the symbol for the first portion 507, which encodes the data "10" in the example. The modulated, upconverted signal is provided to the switch 514, and the state of the switch determines whether the signal is provided to the antenna feed 524 for the vertical polarization antenna 520 or the antenna feed 526 for the horizontal polarization antenna 522.

In some implementations, the transmitter 500 includes a switch controller 512 configured to set the state of the switch 514. The switch controller 512 can be configured to receive the second portion 509 from the data router 506 and set the switch 514 accordingly. For example, the switch controller 512 can receive a data bit from the data router 506 that determines the polarization to be used, and the switch controller 512 sets the state of the switch 514 so that the correct polarization is used.

In the illustrated example, the switch controller 512 receives the data bit of "1" from the data router 506. In response, the switch controller 512 can instructs the switch 514, which is a single-pole double-throw (SPDT) switch in the example, to connect the output from the upconverter 510 to the transmission line coupled to the vertical polarization antenna 520. If the switch controller 512 instead received the data bit of "0" from the data router 506, the switch controller 512 would instruct the switch 514 to connect the output of the upconverter 510 to the transmission line coupled to the horizontal polarization antenna 526.

The switch controller 512 and switch 514 can be configured to switch between the different antenna feeds 514, 526 at a high rate, including for each symbol transmission. The switch controller 512 can also be synchronized with the modulator 508 and upconverter 510 so that the switch 514 is in the correct state to pass each symbol when the signals for that symbol are provided to the switch 514.

The transmitter 500 can include a timing synchronization subsystem 516 that aligns the timing of switch control and output of the upconverter 510. For example, the transmitter 500 can be designed or calibrated to take into account the delay or switching time needed to change the state of the switch 514, as well as the timing needed to generate a modulated, upconverted signal from data from the data router 506. The timing synchronization subsystem 516 can coordinate with the various components of the transmitter 500 to ensure that the switch controller 512 aligns changes of the state of the switch 514 with the beginning of symbol transmission periods, so that the signals for each symbol will be routed through the switch 514 to the antenna feed for the appropriate polarization. The transmitter 500 can be configured with timing offsets determined based on the timing characteristics of the various components. For example, if there is a difference between the time needed to generate the modulated, upconverted signal and the time needed to set the switch state, an appropriate offset can be set to align the switch timing with the symbol transmission timing. For example, if the switching time of the switch 514 is 5 nanoseconds, the transmitter 500 can configure the switch controller 512 to initiate a change in switch state 5 nanoseconds before the time that the new modulated, upconverted signal will reach the switch 514. Coordinated clock signals or other techniques can be used to provide a common reference for the components. When the transmitter 500 is designed and built, the timing characteristics of the various components can be determined, and the timing settings can be aligned and calibrated so that changes to the state of the switch 514 are carried out to pass signals for each symbol to the antenna 520, 522 for the proper polarization. As a result, the components of the transmitter 500 timely provide the signals for each modulated symbol for the first portion 507 of a data segment to be transmitted with the correct polarization set by the second portion 509.

The transmitter 500 can include a power amplifier 518 coupled to amplify signals provided to the vertical polarized antenna 520. The transmitter 500 can also include a power amplifier 519 coupled to amplify signals for the horizontal polarized antenna 522. In some implementations, the power amplifiers 518, 519 may be integrated with the switch 514. The power amplifiers, e.g., 518 and 519, can increase the gain or power for signals to a desired power level for transmission by the antennas 520, 522.

The output of the power amplifiers 518, 519 is carried to the antennas 520, 522 by corresponding antenna feeds 524, 526. Depending on the setting of the switch 514, the modulated signals for a symbol to transmit can be provided to either antenna feed 524, 526 and thus be transmitted with either of two orthogonal polarizations. In the illustrated example, the switch 514 is set by the value of the second portion 509 to route output signals to the antenna feed 524 for the vertical polarization antenna 520, and so the symbol for "10" is transmitted with vertical polarization.

The transmitter 500 can thus transmit a propagating wave that is polarized according to either a vertical or horizontal polarization to the satellite 120. In a terminal 130, the transmitter 500 transmits the polarized propagating wave to the gateway system 105 over the satellite 120. In the gateway system 105, the transmitter 500 would transmit the polarized propagating wave to a designated terminal over the satellite 120.

As noted above, the transmitter 500 can provide, for example, a 1 bit-per symbol increase in throughput compared to communication device that uses a single transmitter with a single RF transmit chain (e.g., using QPSK and only a single polarization) and does not encode data by selecting among multiple polarizations. Although FIG. 5 illustrates use of QPSK modulation, e.g., with 2 bits per symbol transferred, any carrier modulation scheme can be used with and enhanced by the techniques for varying polarization, and different modulation schemes can be used at different times or under different conditions.

Figure 6:
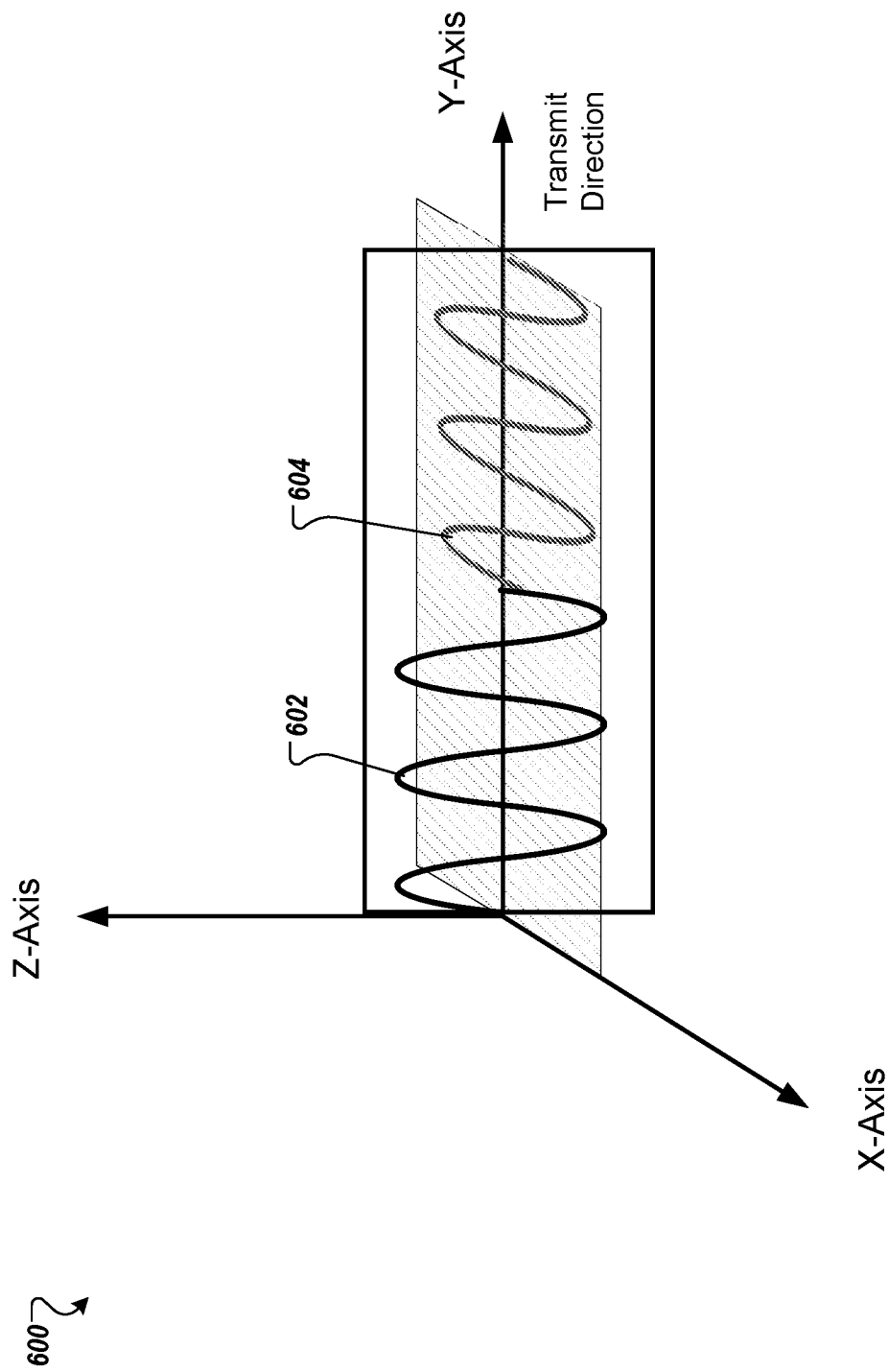
FIG. 6 is a diagram showing an example of symbols transmitted using different polarizations.

FIG. 6 is a diagram showing an example of cross-polarized transmission 600. The example of FIG. 6 illustrates a vertical polarization waveform 602 serialized with a horizontal polarization waveform 604. The two waveforms 602 and 604 are transmitted from a transmitting antenna at a terminal or gateway system, and can be transmitted along the Y-axis direction. The two waveforms 602 can be transmitted along the Z-axis. The two waveforms 602 can be transmitted along the X-axis. In the example shown in FIG. 6, the Y-axis can be labeled as the traveling direction of the propagating waveforms and the Z-axis can be labeled as the amplitude of the propagating waveforms. The X-axis can be labeled with the widths of the propagating waveforms.

In some implementations, the receiver can receive both incoming polarization signals, simultaneously. For example, in order for a receiver to receive and independently detect both of the vertical and horizontal waveforms, the receiver can simultaneously receive both incoming polarization signals and subsequently serialize both waveforms. The receiver can include a similar cross-polarized antennae, e.g., include both vertical and horizontal polarized antennae, such as the cross-polarized antennae found on the transmitter. In this instance, the receiver can receive both polarization signals, serialize both received polarization signals, and identifying distinctions between both polarization signals. The example of FIG. 6 illustrates the horizontal polarization waveform 604 transmitted followed by the vertical polarization waveform 602. The receiver can receive both the horizontal polarization waveform 604 and the vertical polarization waveform 602, and subsequently process both waveforms independently.

Figure 7:
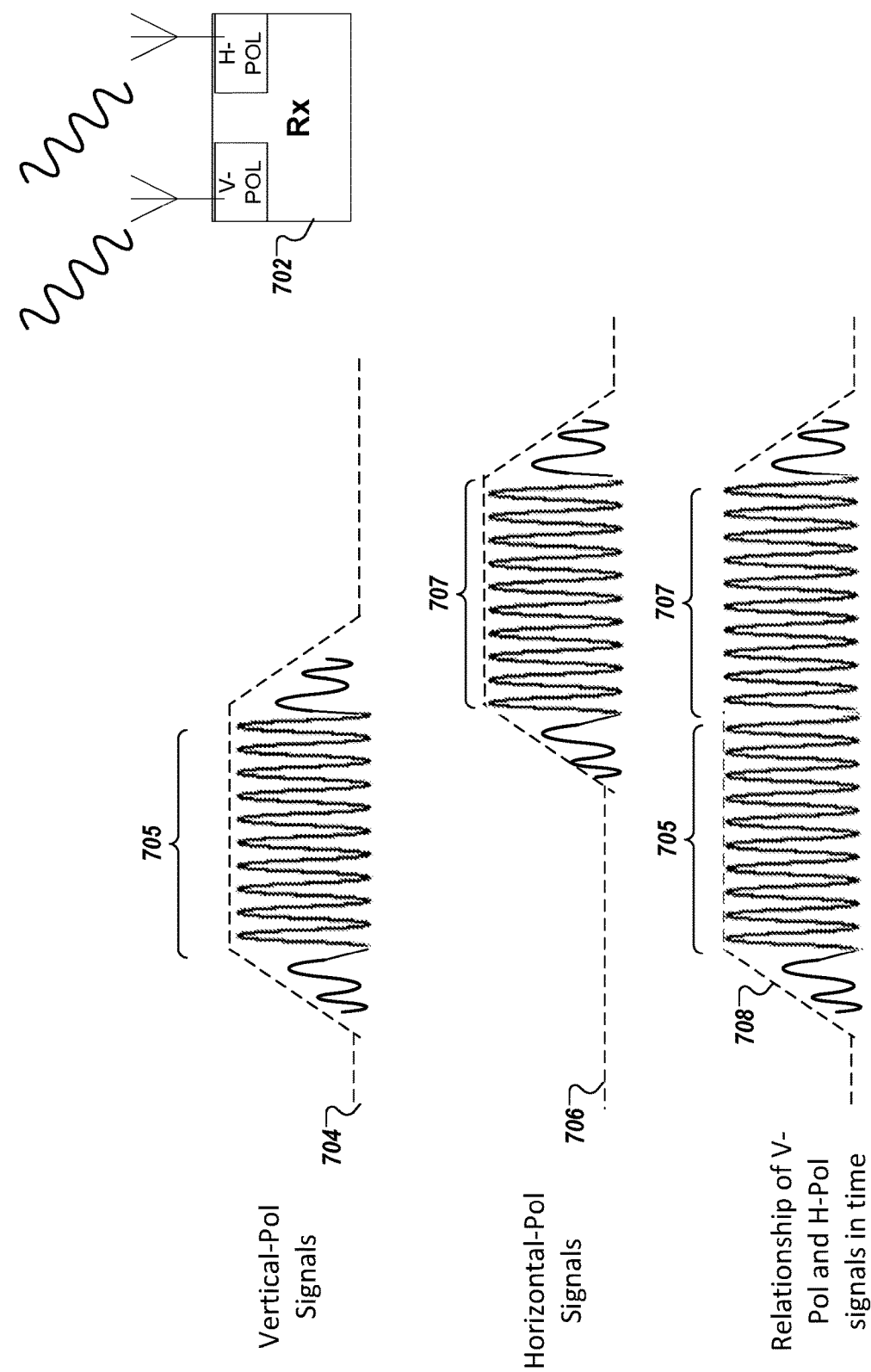
FIG. 7 is a diagram showing symbols transmitted using different polarizations.

FIG. 7 is a diagram showing an example of a receiver 702 that can receive signals transmitted with different polarizations. With the techniques discussed above, a transmitter can select the polarization for each transmitted symbol separately, and so the polarization of transmitted symbols can vary from symbol to symbol as needed to convey information. The transmitter transmits only one symbol at a time, and so there is only one polarization used at a time.

The receiver 702 can include a vertical polarization antenna and a horizontal polarization antenna. In some implementations, the two antennas are integrated together, such as in a single dish or other assembly. The gateway system 105 and each of the terminals 130 can include a receiver 702 to receive signals transmitted using RF modulation as well as variation in polarization to convey information.

The receiver 702 can receive vertical polarization signals 704 and horizontal polarization signals 706. The example shown illustrates two symbols, a first symbol 705 transmitted using vertical polarization during a first symbol period, and a second symbol 709 transmitted during a second symbol period. The combined representation 708 shows how the two signals for the two symbols 705, 707 are aligned in time but not overlapping, consistent with the transmission scheme discussed above.

The choice of polarization used for transmission of a symbol encodes at least one bit of transmitted information, so the receiver 702 extracts information based on the polarization used. For example, the use of vertical polarization can be assigned to represent the value "1" and use of horizontal polarization can be assigned to represent the value "0." The receiver 702 receives the vertical polarization signals 704 through one antenna feed and receives the horizontal polarization signals 706 through another antenna feed. Electromagnetic polarization is a property of the wireless signal propagating through space, and is lost upon reception by an antenna. Nevertheless, because the signals for different polarizations are detected using different antenna portions and are transmitted initially through different conductors, the receiver 702 can examine the two sets of received signals to determine which polarization was used for each symbol.

For example, for each symbol period, the receiver 702 can examine the signals on the antenna feeds for the vertical polarization and horizontal polarization, respectively, to determine which set of received signals has the characteristics of a transmitted symbol (e.g., appropriate power level, consistency, frequency content, etc.). As a result, the receiver 702 can determine which of the two polarizations was used to transmit a symbol, and the receiver 702 can decode a bit of transmitted information based on the detected polarization used. For example, when the signals for symbol 705 are detected on the antenna feed for vertical polarization, the receiver 702 can identify one transmitted bit as "1" simply for being transmitted with vertical polarization, in addition to any other bits represented by the symbol 705. Similarly, when the signals for symbol 707 are detected on the antenna feed for horizontal polarization, the receiver 702 can identify one transmitted bit as "0," in addition to the bits represented by the symbol 707. This aspect enables the receiver 702 to demodulate at least one bit per symbol from the identification of the polarization used for the symbol, often separately from and independently of the content of the symbol itself.

Figure 8A:
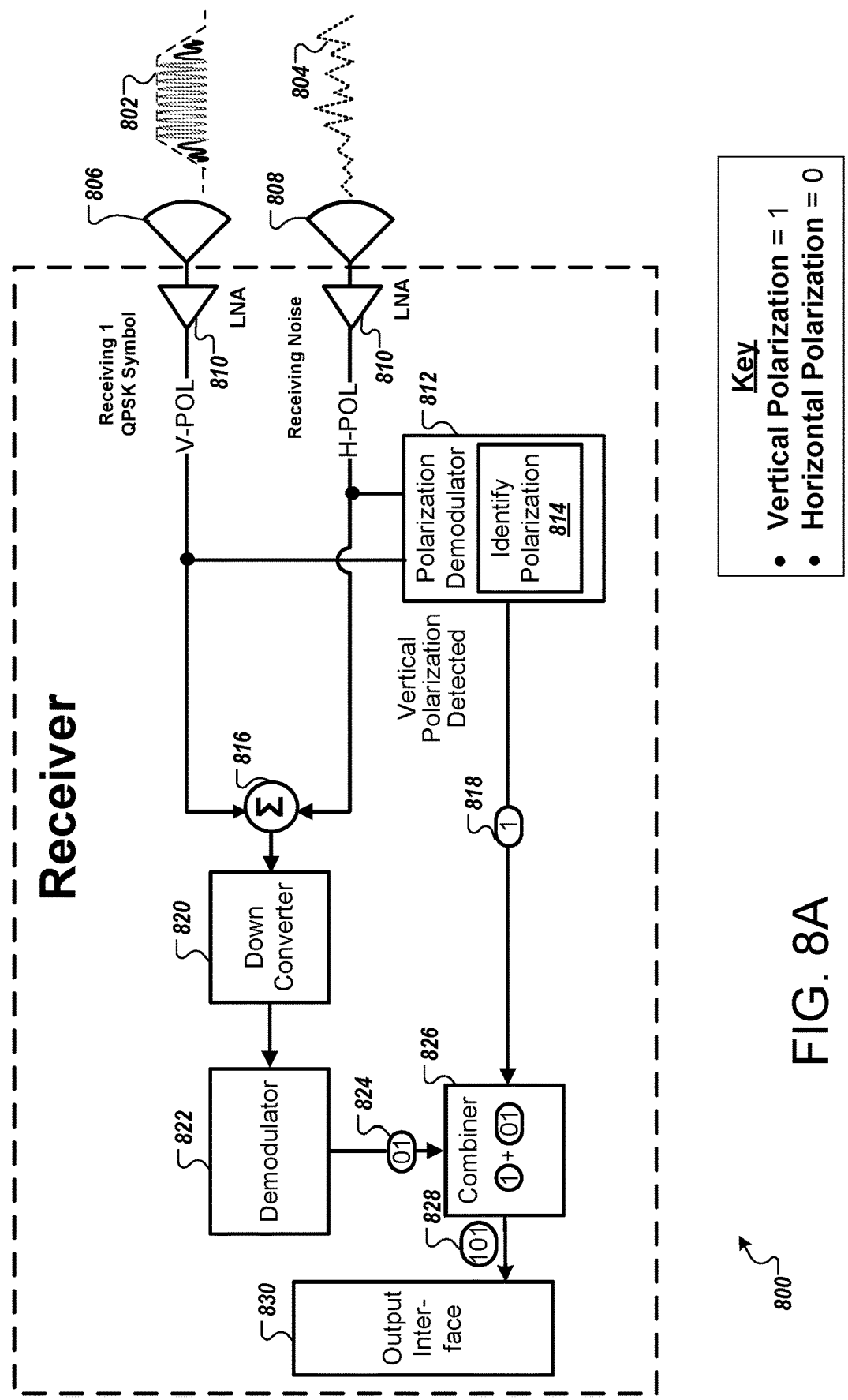
FIGS. 8A-8C are diagrams showing examples of a receiver that can receive transmissions made using carrier modulation and polarization modulation.

FIG. 8A is a diagram showing an example of a receiver 800 that can receive transmissions that encode data in the modulation of an RF carrier as well as variation of the polarization used for transmission. For example, the receiver 800 can determine, for each symbol period, which polarization was used to transmit a symbol, and can extract one or more bits of information based on the polarization used.

The architecture of the receiver 800 enables the use of a single RF receive chain (e.g., a single downconverter and demodulator) to receive data transmitted using two different polarizations. The receiver 800 does not need separate RF receive chains for different polarizations, and yet still receives more information than could be transmitted with a single polarization alone.

The receiver 800 can include various components that can receive signals 802 transmitted with vertical polarization and signals 804 transmitted with horizontal polarization. The receiver 800 can be configured to receive other polarizations (e.g., a different pair of orthogonal polarizations) such as, for example, circular-polarized signals (e.g., RHCP and LHCP) and slant-polarized signals (e.g., +45° slant and −45° slant). FIG. 8A also illustrates a key indicating how a detected polarization is translated to a data value. For example, the key indicates that when a symbol with vertical polarization is received, the receiver 800 extracts a bit of "1" based on the polarization, and when a symbol with horizontal polarization is received the receiver 800 extracts a bit of "0" based on the polarization. The content of the symbol is then demodulated so that the data represented by the symbol itself is also extracted.

The receiver 800 can be integrated with the gateway system 105 and/or each of the terminals 130 to provide reception capabilities. For example, when the receiver 800 is integrated within one of the terminals 130, the receiver 800 can receive signals representing a data stream from the gateway system 105 via the satellite 120. When the receiver 800 is integrated within the gateway system 105, the receiver 800 can receive a transmitted data stream from each of the terminals 130 over the satellite 120. As discussed above, each transmitted data stream can include components transmitted using different polarizations (e.g., some symbols transmitted with horizontal polarization, other symbols transmitted with vertical polarization).

The receiver 800 can include various components to receive and process signals having any of multiple polarizations. For example, the receiver 800 can include a vertical polarization antenna 806, a horizontal polarization antenna 808, one or more low noise amplifiers (LNA) 810, a polarization demodulator 812, a signal combiner 816, a downconverter 820, a demodulator 822, a data combiner 826, and an output interface 830. The illustrated example of receiver 800 may also include other components such as, for example, one or more decoders, one or more pulse shaping filters, one or more bandpass filters, and one or more analog-to-digital converters (ADCs), to name some examples. The receiver 800 may include other components for processing the received data, such as those components included within a superheterodyne receiver.

The example of FIG. 8A shows processing performed for a single symbol period, where the receiver 800 receives a single symbol in the signals 802 transmitted with vertical polarization. For this symbol period, the transmitter does not transmit any symbol using horizontal polarization. Nevertheless, the horizontal polarization antenna 808 may still receive noise and interference depending on the conditions. The vertical polarization antenna 806 and the horizontal polarization antenna 808 each provide their received signals over a corresponding antenna feed to a corresponding low noise amplifier (LNA) 810. Each LNA 810 can amplify the signals from the connected antenna feed. For example, the LNA 810 can increase the sensitivity of receiver 800 by amplifying the received signals with minimal distortion and noise.

The amplified signals from each LNA 810 are provided to the polarization demodulator 812, which identifies which of the two polarizations was used to transmit the current symbol. Once wireless signals are received by an antenna, the polarization characteristics are lost, since polarization is a characteristics of the waves propagating through free space. Nevertheless, different antenna portions are used to receive signals transmitted with different polarizations, and so different antenna feeds or input lines respectively indicate the received signals transmitted with different polarizations. For example, signals from the antenna 806 are those received based on wireless signals with vertical polarization, and signals from the antenna 808 are those received based on wireless signals with horizontal polarization. The polarization demodulator 812 can evaluate the signal properties of the two sets of received signals (e.g., amplified signals from antennas 806 and 808) to determine which set of received signals (e.g., from horizontal polarization or from vertical polarization) is most likely to be or include a transmitted symbol. The polarization demodulator 812 can make a decision regarding which polarization was used to transmit the current symbol, and can output data 818 extracted based on the polarization decision. This is shown as identifying the polarization 814 used to transmit a symbol. The polarization demodulator 812 can perform the identification by evaluating signals received from each antenna 806, 808 separately, as well as by comparing among the signals from the antennas 806, 808. The polarization demodulator 812 does not need to actually demodulate or verify the presence of any specific symbol, but can instead determine whether it is likely (e.g., with at least a threshold likelihood) that signal characteristics for a given polarization are consistent with a received symbol transmission.

The polarization demodulator 812 can analyze characteristics of signals from the different antenna feeds to identify which polarization was used to transmit the current symbol, if any is transmitted. In the illustrated example, the signals 802 with vertical polarization include a transmitted symbol, while signals 804 do not and instead may include noise and interference. The polarization demodulator 812 can compare and analyze the characteristics of the sets of signals to identify which polarization was used. For example, the polarization demodulator 812 can analyze characteristics of the analog signals such as received power, frequency, amplitude, phase variation, consistency or variation of the signals over the symbol period, and so on. In general, the receiver 800 can store reference values that indicate the values or ranges of values that are most likely to represent transmitted signals. The receiver 800 can also use information about recent reception (e.g., power levels of recently received symbols, noise and interference measurements, and so on) to set as a baseline level representing recent reception conditions.

As a simple example, the characteristics examined can include a power or energy level of each set of received signals and a spectral bandwidth of each set of received signals. If the polarization demodulator 812 determines that the power energy level of the received signals for a given polarization satisfies (e.g., meets or exceeds) a threshold energy level, then the polarization demodulator 812 can select the polarization corresponding to those signals as the polarization that was used during transmission. In the illustrated example, the receiver 800 can determine that the power level of the vertical polarization signals satisfies a minimum power threshold while the power level for the horizontal signals does not satisfy the minimum power threshold, so a transmission is identified as occurring with vertical polarization. In some implementations, the characteristics of signals for two polarizations can be compared, such as to determine which of the two has the higher power level. Thus, even if signals from both polarizations meet a power level threshold, the one with the highest power level can be identified or other factors can be employed (e.g., frequency analysis, consistency, etc.) can be used to make the decision.

The polarization demodulator 812 can analyze other characteristics of each received set of signals (e.g., for each polarization). For example, the polarization demodulator 812 can analyze a consistency of the received power level over a length of a transmitted symbol period. The polarization demodulator 812 can analyze how the energy level of each set of received signals changes over the duration of the symbol period. The polarization demodulator 812 can measure the consistency of the energy level by monitoring the amplitude of the received signals and measuring variation in the amplitude of the received signals changes over the transmitted symbol period. If the changes differ by an amount greater than a predetermined threshold (e.g., to the point that they are more characteristic of noise or interference than a transmitted symbol), then the polarization demodulator 812 can determine that this polarization was not used to transmit a symbol in the current symbol period. In some cases, the polarization demodulator 812 can use power levels, consistency, and other factors together in making a determination. For example, the polarization demodulator 812 can select a polarization as having a transmitted symbol when (i) the energy level does not change more than a threshold amount during the transmitted symbol period, and (ii) the power level of the received signals is greater than a threshold during the transmitted symbol period.

The polarization demodulator 812 can compare the received signals or their characteristics with profiles for known transmitted data symbols to aid the polarization demodulator 812 in detecting when a symbol has been transmitted. For example, the polarization demodulator 812 can store profile data that represents characteristics of a typical symbol transmission, information such as an expected bandwidth, an expected amplitude, an expected distribution of power levels over certain frequency ranges, and so on. The polarization demodulator 812 can compare the characteristics of received signals with the characteristics in the profile(s) to assess the similarity with the profiles.

In some implementations, the polarization demodulator 812 can apply a matched filter that attempts to match the received signals to one or more of the stored data that represents the typical symbol transmission. To perform matched filtering, the polarization demodulator 812 can optionally downconvert the received signals to the intermediary frequency and perform the matched filtering at the intermediate frequency. Matched filtering may be performed at the intermediate frequency to reduce the amount of processing required. Matched filter performed at the carrier frequency may require the polarization demodulator 812 to utilize unnecessarily large amounts of power, e.g., watts. In response to matched filtering, the polarization demodulator 812 can sample the matched filtering output by providing the matched filtering output to one or more ADCs. In response, the polarization demodulator 812 can compare the sampled output, i.e., the digital output from the ADCs, to a threshold value to determine whether the matched filtering output satisfies the threshold value. If the matched filtering output satisfies the threshold value, then the polarization demodulator 812 can deem that it has received a known transmitted symbol, and identify the polarization that was used for transmission of the transmitted symbol.

In some implementations, the polarization demodulator 812 can also compare the received signals with other patterns. These other patterns can include, for example, noise profiles, noise floors, an interference signal, and other noisy or distorted signals. For example, the polarization demodulator 812 can compare the analog representation of the received signals to profiles of noise, e.g., interference and other noise, to rule out the signal appearing to be noise. In this case, if the polarization demodulator 812 determines the received signals are likely noise, e.g., based on a comparison of the received signals matching to a profile of noise or interference, then the polarization demodulator 812 can determine that that signals did not include a transmitted symbol.

In some implementations, the polarization demodulator 812 can also analyze a consistency of characteristics of each received set of signals to make determinations indicative of the polarizations transmitted. For example, the polarization demodulator 812 can analyze the characteristics of each received set of signals that includes, for examples, a magnitude, duration of a magnitude, a spectrum profile of the received set of signals, e.g., power spectral density of the received signals, carrier frequencies of the received signals, and other characteristics of the received signals. The polarization demodulator 812 can analyze a consistency of these characteristics against known symbol transmissions on that polarization, to distinguish received signals that are similar to transmitted symbols from signals that are not (e.g., noise or interference). The characteristics examined can include, for example, different magnitude consistencies, different spectrum consistencies, and different noise floors found between the polarizations.

Similarly, according to the type of polarization, the received signals can exhibit different distributions of power around the carrier frequency, different noise floor levels, different noise characteristics in the received signals, and different interference characteristics. The polarization demodulator 812 can seek to identify one or more of these characteristics from each received set of signals (e.g., for each polarization). If one or more of these characteristics are present in a received set of signals, then the polarization demodulator 812 can determine that a symbol was transmitted on a corresponding polarization. Moreover, the polarization demodulator 812 can determine the corresponding polarization of the transmitted symbol, and output the corresponding polarization to subsequent components in the receiver 800.

In some implementations, the polarization demodulator 812 can include one or more trained machine-learning models. The one or more trained machine-learning models can be configured to receive data indicative of the received set of signals and data indicating the antenna that received the signals, e.g., vertically polarized antenna or horizontally polarized antenna. For example, the polarization demodulator 812 can extract characteristics of the received signals and use these characteristics as input to the trained machine-learning models. Moreover, the polarization demodulator 812 can provide as input a number, such as "0" or "1", that indicates whether the received signals was received by the vertically polarized antenna, e.g., represented by a value of "0", or was received by the horizontally polarized antenna, e.g., represented by a value of "1". Other examples for representing the antenna that received the signals are also possible.

The characteristics of the received signals can include, for example, the energy levels of the signals, the consistency of the energy level of a transmitted symbol period, e.g., a power level of the received signals over time, a consistency of a magnitude, a duration, and a spectrum profile of the received signals against other known transmission, and other characteristics. The polarization demodulator 812 can extract these statistics from the received signals and provide these statistics as input to the trained machine-learning models. For example, the polarization demodulator 812 can determine that a received signals has a range of 10-12 dB amplitude during typical symbol transmission, a consistency of 10 dB during half of the transmitted symbol period, a spectrum profile that include roll-off regions, an elevated magnitude of amplitude power, a carrier frequency of 12 GHz, i.e., which matches to the carrier frequency of the known transmitted symbol, and other characteristics of the transmitted symbol. Moreover, the polarization demodulator 812 can determine that the received data that has these characteristics was received on the vertical polarization antenna 806, which the polarization demodulator 812 can flag as a value of "0," for example.

In response, the polarization demodulator 812 can provide, for a received set of signals, the (i) corresponding identified statistics and (ii) data identifying the antenna which received the corresponding signals, to the one or more trained machine-learning models. The one or more trained machine-learning models can output data that indicates whether the received set of signals represents a transmitted symbol. The output data can be, for example, a percentage, a number between 0 and 1, or a label, which indicates how likely the received set of signals represents a transmitted symbol. The one or more trained machine-learning models can include a Long Shor-Term Memory (LSTM) Recurrent Neural Network (RNN). The LSTM RNN can be employed to predict whether statistics or data of received signals represents a transmitted symbol. The one or more trained machine-learning models can be trained at the gateway system 105, deployed to the receivers 800 at the gateway system 105, and deployed to the receiver 800 at each of the terminals 130.

In the example if the one or more trained machine-learning models of the polarization demodulator 812 output a percentage or statistical likelihood indicating whether the received signals represents a transmitted symbol, the polarization demodulator 812 can enhance the trained machine-learning models process by applying threshold detection to its output. For example, if the one or more trained machine-learning model outputs a 65% likelihood that corresponding received signals represent a transmitted symbol, the polarization demodulator 812 can compare the 65% likelihood to a threshold value 70%. The threshold value of 70% can be designated as other values, with higher threshold values improving the accuracy of the receiver 800. If the trained machine-learning model's output satisfies the threshold value, e.g., meets or exceeds, then the polarization demodulator 812 can (i) deem a transmitted symbol has been identified and (ii) output data 818 that represents the polarization of the signals used to transmit the symbol detected. For example, the polarization demodulator 812 can (i) deem a transmitted symbol has been identified and (ii) output data 818 that represents the transmitted symbol was transmitted on the vertical polarization antenna.

In some implementations, the polarization demodulator 812 can weight different techniques to identify whether a transmitted symbol was detected. For example, the polarization demodulator 812 can apply weights to the output of different techniques for detecting a transmitted symbol. For example, the polarization demodulator 812 can apply a weight of 20% to the output of detecting received energy levels of the signals to detect a transmitted symbol, a weight of 30% to the output of measuring consistency of the energy level over the transmitted symbol period, a weight of 10% to the output of measuring consistency across magnitude, duration, and spectrum profile of the received signals to known symbol transmission profiles, and a weight of 40% to the output of the one or more trained machine learning models. The polarization demodulator 812 can sum the weighted output values. In response, the polarization demodulator 812 can compare the weighted sum to a threshold value, and if the weighted sum satisfies the threshold value, then the polarization demodulator 812 can deem a transmitted symbol has been identified. If the weighted sum does not satisfy the threshold value, then the polarization demodulator 812 can deem a transmitted symbol is not identified for the polarization.

Generally, in response to determining a transmitted symbol was identified on a corresponding antenna feed, the polarization demodulator can output a value that signifies or indicates which polarization was used for transmission. For example, as illustrated in FIG. 8A, the polarization demodulator 812 can output a value of "1," which indicates the transmitted symbol was detected on the vertical polarization. As mentioned above, the polarization demodulator 812 outputs the value of "1," which is a bit determined based on the type of polarization of the received symbol, because the type of polarization used during transmission indicates transmitted data encoded into the transmitted waveform.

This data is later used by the data combiner 826 when recreating the output data stream, which is further described below.

In some implementations, the polarization demodulator 812 can output the vertical polarization signals and the horizontal polarization signals to a signal combiner 816. Generally, the signal combiner 816 can sum together the signals from the vertical and horizontal polarization antenna feeds. For example, the two sets of signals can be summed together in the analog domain. The summed signals can then be further processed with downconversion and demodulation. This way, regardless of which polarization was used for transmitting a symbol, the received signal will be included in the summed output and will be provided to the demodulator. Nevertheless, given the transmission scheme used, only one of the antenna feeds will carry a transmitted symbol at a time. The addition of signals from the other antenna feed not used to provide a symbol during that symbol period may contribute noise and interference. In the illustrated example, by summing together the received signals 802 (containing a transmitted symbol in this example) received with vertical polarization using antenna 806 and the signals 804 (containing noise in this example) received with horizontal polarization using antenna 808, a greater amount of SNR or signal margin may be needed to properly extract the bits from the symbols.

The downconverter 820 receive the summed signals from the vertical polarization and horizontal polarization antenna feeds. The downconverter 820 can convert the summed signals at the carrier frequency to a lower frequency, such as an intermediate frequency. Subsequent processing by the demodulator 822 can be performed at the intermediate frequency or down at baseband, for example. The downconverter 820 provides the downconverted summed signal to the demodulator 822 for further processing.

The demodulator 822 can receive the downconverted signal from the downconverter 820. The downconverted signal can be an analog signal. In order for the demodulator 822 to process the signal, the demodulator 822 may include one or more analog-to-digital converters (ADCs) that can output digital samples corresponding to the analog input signals supplied. The demodulator 822 can process digital samples from ADCs to demap a received symbol to one or more bits, according to the modulation scheme being used. The receiver 800 and the transmitter 500 can use an agreed-upon modulation scheme. For example, as mentioned, the modulation scheme can include BPSK, 8-PSK, QPSK, and 16-QAM, to name some examples. The demodulator 822 can receive the digital samples representing a transmitted symbol and output the bits representing the symbol, according to the agreed-upon modulation scheme. As illustrated in FIG. 8A, the demodulator 822 can output a value 824 of "01" for a symbol in the QPSK modulation scheme. The demodulator 822 can supply the value 824 to the data combiner 826.

In some implementations, the data combiner 826 combines the data 818 from the polarization demodulator and the data 824 from the demodulator 822 and combines them into output data 828. The data combiner 826 thus assembles the output data stream by combining the information extracted from the data from the transmitted symbol (e.g., data 824) with data extracted from the type of polarization used to transmit the symbol (e.g., data 818). For example, the data combiner 826 can interleave the data determined based on the type of polarization used with the data determined based on the transmitted symbols. Thus, the data combiner 826 can insert the polarization-derived bits into the received data stream from the demodulator 822. In another way, the data combiner 826 can be considered to concatenate the two pieces of received data, alternating between the polarization-derived data and the symbol-derived data. The polarization-derived data, e.g., data 818, can be placed in front or behind the data 824, according to the convention established and used for making the transmission.

The data combiner 826 can receive the data 824 and the data 818 that represents the polarization corresponding to the antenna feed that provided the received set of signals that includes the detected symbol. The data combiner 826 can combine the data 824 and the data 818. In order for the combination to be possible, the data 818 output by the polarization demodulator 812 can include a data type that matches to the data type of the data 824. For example, data 824 represents bits "01" and the data 818 represents a bit "1". The data combiner 826 can insert the data 818 into the data 824 according to a predetermined convention or standard used by both the transmitter 500 and the receiver 800. For example, an implementer of the transmitter 500 may determine that the data router 506 of FIG. 5 extracts the most significant bit (MSB) as the bit used to encode the switch controller 512. Similarly, the implementer of the receiver 800 can ensure the data combiner 826 inserts the data 818 as the MSB in the data 824. In this example, the data combiner 826 can output a bit data value 828 of "101". Other examples are also possible. For example, when the implementer of the transmitter 500 and the receiver 800 utilizes the least significant bit (LSB) instead of the MSB, the data router 506 extracts the LSB as the bit used to encode the switch controller 512 and similarly, the data combiner 826 inserts the data 818 as the MSB in the data 824. In the latter example, the data combiner 826 can output a bit data value 828 of "011". The functions performed by the data combiner 826 can include, for example, masking, concatenation, insertion, and other functions.

The value 828 output by the data combiner 826 represents the symbol transmitted by the transmitter 500. For example, the bit data value 828 of "101" represents the bit values that were processed by each of the components of the transmitter 500, transmitted by the vertical polarized antenna 520 to the receiver 800 over the satellite 120, and subsequently processed by the components of the receiver 800. Other data symbols can be transmitted by the transmitter 500 and subsequently received and processed by the receiver 800. In response, the data combiner 826 can provide the bit data value 828 to the output interface 830.

In some implementations, the output interface 830 can receive the bit data value 828 and can store the data to be displayed. The output interface 830 can include memory components for storing the bit data value 828 and subsequent bit data values. For example, the output interface 830 can include a cache memory or other memory. The output interface 830 can include a component that enables other components of the terminal 130 or the gateway system 105 to retrieve the bit data value 828 from its corresponding memory. For example, the output interface 830 can include a user interface or display that displays the contents of the bit data value 828. The output interface 830 can communicate with a port to provide data to the other components within the terminal 130 or the gateway system 105. Other examples are also possible.

In some implementations, the receiver 800 can also include one or more decoders that can process the recovered bit data value 828. The one or more decoders can perform a decoding function to recover the original bits that were originally encoded by the one or more encoders of the transmitter 500, such as the encoding performed by the source encoders and the channel encoders of the transmitter 500. Moreover, the receiver 800 can relay the recovered bits to another device over a network, such as a client device connected to the receiver 800.

Figure 8B:
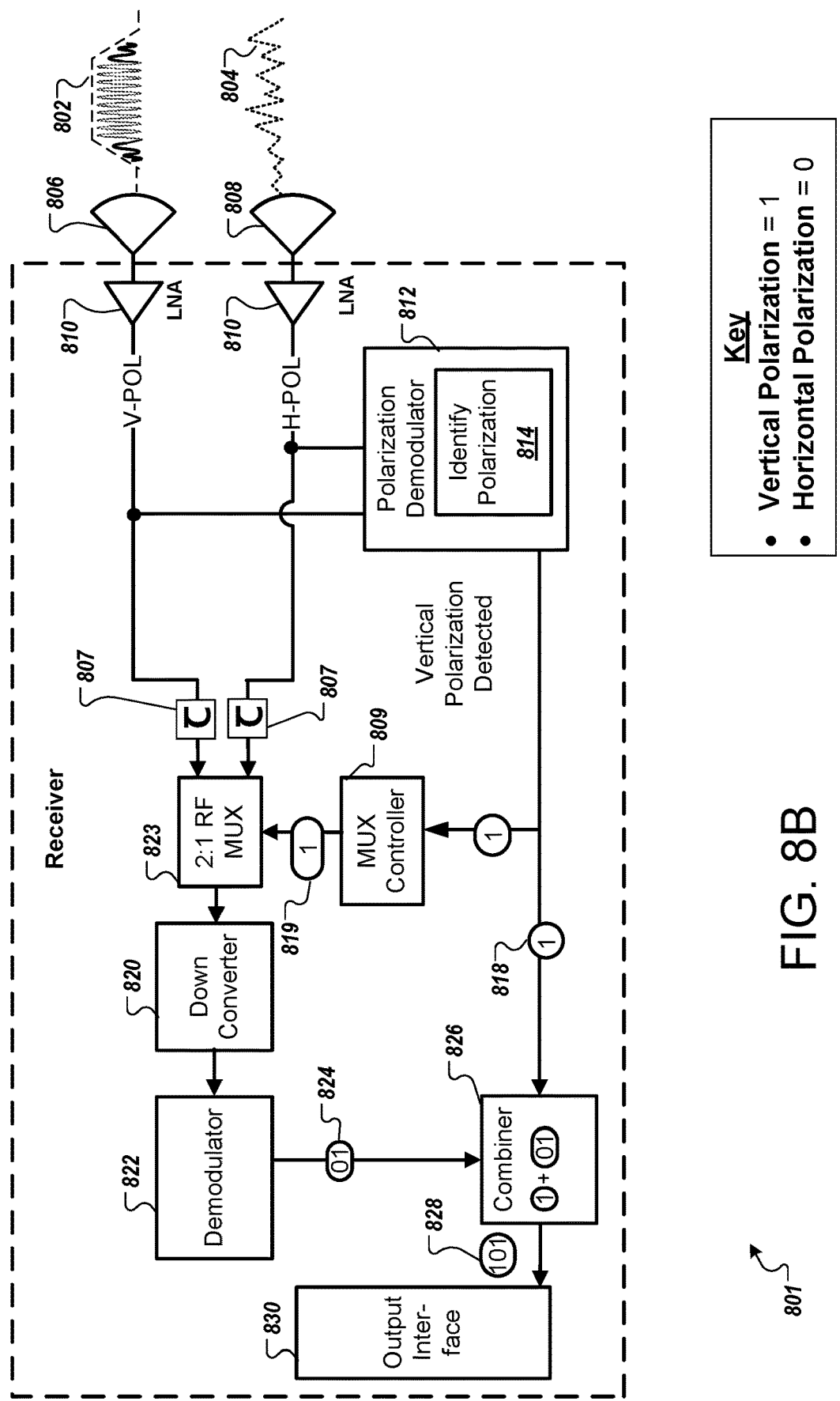

FIG. 8B is another diagram showing an example of a receiver 801 that can extract transmitted data from the polarization used to transmit symbols. For example, the receiver 801 determine, for each symbol period, a polarization of a received symbol and determine at least one bit from the polarization used. The receiver 801 includes many of the same components as receiver 800 (e.g., antennas 806 and 808, LNAs 810, polarization demodulator 812, data combiner 826, downconverter 820, demodulator 822, and output interface 830), which will not be described again here. The receiver 801 can integrated in the gateway system 105 and in each of the terminals 130 to receive wireless transmissions that encode data through varying the polarization used.

In some implementations, the receiver 801 performs similar processes to those performed by the receiver 800. However, instead of summing the received RF signals at the signal combiner 816 as done by the receiver 800, the receiver 801 selects a single set of signals to process for each symbol period, based on the identification of which polarization carries the transmitted symbol. The receiver 801 uses the polarization demodulator 812 to generate data 818 that indicates which polarization was used. The receiver 801 also uses the identified polarization to set the select line value for a 2:1 RF multiplexer (MUX) 823 that selects between the signals received for different polarization to pass signals from a single antenna feed on for demodulation processing. For each symbol period, the RF MUX 823 passes the signals from only one of the antenna feeds, so received signals for only one polarization are demodulated at a time. This selective routing of the antenna feeds avoids adding noise from the non-selected antenna feed into the demodulation processing. As a result, the SNR requirements are no greater than would be used for conventional reception using a single polarization.

In addition to the previously described components in the receiver 800, the receiver 801 also includes an RF MUX 823, delay devices 807, and a MUX controller 809. In some implementations, the polarization demodulator 812 can process each received set of signals 802 and 804 and ultimately determine which polarization was used for transmission. The polarization demodulator 812 can output the data 818 to a MUX controller 809, which is used to control the selection of the RF MUX 823. The MUX controller 809 acts similarly to the switch controller 512, and can similarly perform time synchronization similarly to the switch controller 512. For example, the MUX controller 809 can receive data from the polarization demodulator 812 and can convert the received data to a MUX select line value 819. The MUX controller 809 can provide the MUX select line value 819 to the RF MUX 823 for selecting a connection of a switch of the RF MUX 823. For example, data 818 as a value of "1" can generate a MUX selection 821 indicating the vertical polarization signals 802 is passed through the RF MUX 823 to the downconverter 820. Similarly, data 818 as a value of "0" can generate a MUX selection 821 indicating the horizontal polarization signals 804 is passed through the RF MUX 823 to the downconverter 820.

Timing is also an important aspect of the receiver 801. For example, in a series of subsequent time periods, at time to, the polarization demodulator 812 can receive each set of signals and begin processing each set of signals, e.g., accumulating energy, determining which set of signals has a transmitted symbol, and subsequently identifying the polarization used for the set of signals that includes the transmitted symbol, to name some examples. At time $t_1$, if the polarization demodulator 812 determines that a symbol was most likely transmitted on the horizontal polarization, then the polarization demodulator 812 can output data 818 that indicates the symbol was transmitted on the horizontal polarization. At time $t_2$, if the polarization demodulator 812 determines that a symbol was most likely transmitted on the vertical polarization, then polarization demodulator 812 can output data 818 that indicates the symbol was transmitted on the vertical polarization. However, an issue can potentially arise if the polarization demodulator 812 processes and supplies each of the received set of signals 802 and 804 prior to the selector or being set for the RF MUX 823. For example, at the end of the time $t_1$, the polarization demodulator 812 has determined the identified polarization used for transmission. However, the received sets of signals 802 and 804 can be consumed and provided to the RF MUX 823 prior to the MUX controller 809 being able to change the select line setting of the RF MUX 823.

In some implementations, one way to address this situation is by inserting a delay device 807 (e.g., a delay line), on each of the transmission lines for signals vertical and horizontal polarization antennas. The delay devices 807 can provide time for the polarization demodulator 812 to identify the polarization used, and also allow time for the RF MUX 823 to be set to pass signals from the correct source. In addition, the delay devices 807 can be used to help synchronize the arrival of a transmitted symbol at the RF MUX 823 with the corresponding setting of the RF MUX 823. This way, when a transmitted symbol is detected from the vertical polarization antenna 806, the RF MUX 823 is set to pass the signal from the vertical polarization antenna feed at the time the signal arrives at the RF MUX 823. Similarly, when a transmitted symbol is detected from the horizontal polarization antenna 808, the RF MUX 823 is set to pass the signal from the horizontal polarization antenna feed at the time the signal arrives at the RF MUX 823.

Each delay device 807 can delay the received signals before they reach the RF MUX 823 sufficiently to allow the polarization demodulator 812 to select one of the polarizations and for the MUX controller 809 to set the select line signal for the RF MUX 823. For example, each delay device 807 can delay the signals from the vertical and horizontal polarization antennas, respectively, by a duration of one or two symbol periods. The delay provides the receiver 800 with an amount of margin to ensure the correct set of signals is subsequently passed to the downconverter 820. In this manner, by the start of time $t_2$ and with the sets of signals being delayed one or two symbol periods, the RF MUX 823 can be switched to the designated connector according to the output data 818.

Figure 8C:
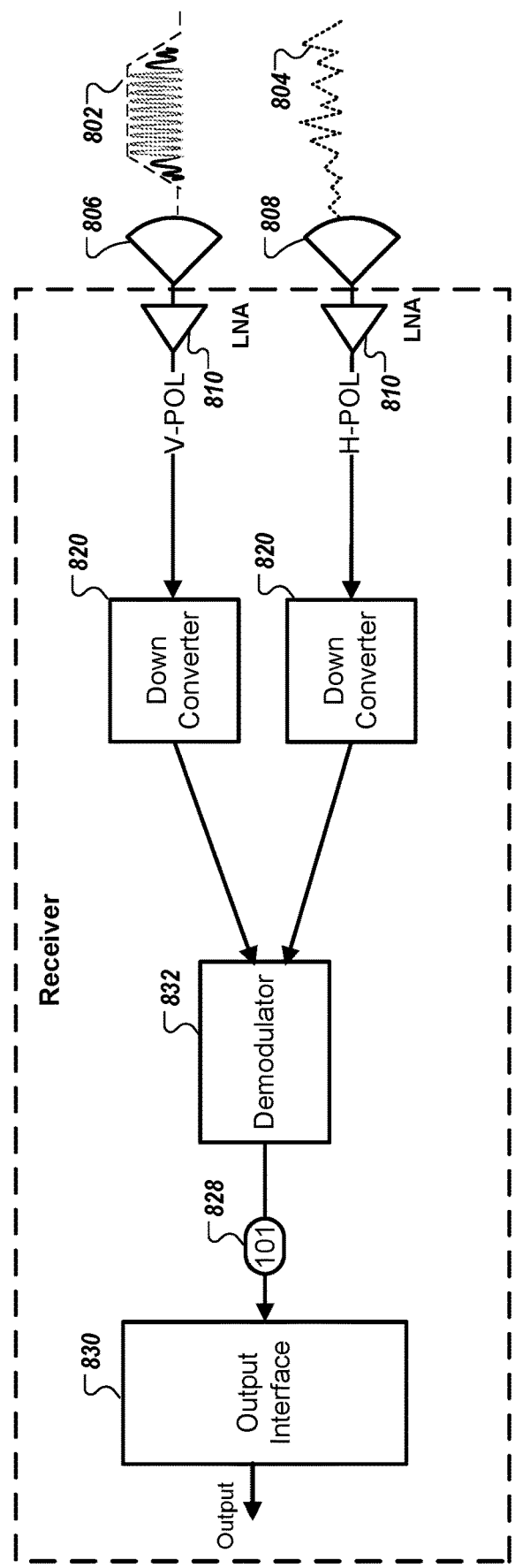

FIG. 8C is another diagram showing an example of a receiver 803 that can dynamically determine an electromagnetic polarization used during data reception. The receiver 803 includes some of the same components receivers 800 and 801 (e.g., antennas 806 and 808, LNAs 810, and an output interface 830). The receiver 803 includes two downconverters 820 that separately downconvert signals received with different polarizations, and uses a demodulator 832 that evaluates both sets of downconverted signals. The receiver 803 can be integrated within the gateway system 105 and within each of the terminals 130.

In some implementations, the receiver 803 performs similar processes to those performed by the receivers 800 and 801. However, the receiver 803 can be configured to use a demodulator 832 that can directly distinguish between all of the symbols utilized for transmission based on signals received on the two polarizations, rather than demodulating the carrier-modulated symbol and the polarization-modulated bit separately. For example, the receiver 803 can directly detect and distinguish between 8 possible symbols in MQPSK, which includes the one bit encoded in the waveform and the two bits demodulated from the carrier waveform. In order for the receiver 803 to distinguish between all possible demodulation types, the receiver 803 can include a demodulator 832, different from demodulator 822 of FIGS. 8A and 8B. For example, the demodulator 832 can receive both sets of signals 802 and 804 that have been downconverted by two downconverters. The demodulator 832 can sample both downconverted sets of signals and generate output data 828 according to both of the demodulated sets of signals.

In some implementations, the demodulator 832 can generate the output data 828 by simultaneously analyzing signal characteristics on both the downconverted sets of signals. For example, the demodulator 832 can effectively analyze the in-phase and quadrature components of both downconverted sets of signals at once, e.g., $I_{H-pol}$, $Q_{H-pol}$, $I_{v-pol}$, and $Q_{v-pol}$. For example, in a standard QPSK constellation scheme with 2 dimensional constellation, the demodulator 832 can analyze four symbols in a constellation diagram, each symbol located in a different quadrant of the constellation diagram. As the demodulator 832 moves clockwise starting from quadrant I, the demodulator 832 can view the following symbols and output their respective bits: symbol A (1,1) equates to bits "00", symbol B (1,-1) equates to bits "01", symbol C (-1,-1) equates to bits "10", and symbol D (-1,1) equates to bits "11". Thus, in the standard QPSK constellation scheme, if the demodulator 832 detects a symbol having coordinates close to symbol D, e.g., such as a symbol having coordinates (-0.707, 0.707), the demodulator 832 can output with a high likelihood that this detected symbol is symbol D and outputs generated output data 828 or bits "11".

However, when the demodulator 832 is analyzing both sets of signals, the demodulator 832 can generate a symbol with four values for the $I_{H-pol}$, $Q_{H-pol}$, $I_{V-pol}$, and $Q_{v-pol}$. By analyzing both sets of signals, the demodulator 832 is performing QPSK selectively for a channel. As a result of generating a symbol with four values from the in-phase and quadrature components of both sets of signals, the demodulator 832 can choose a symbol that best fits the received signal from the eight possible signal combinations defined for the symbols. In this example, the demodulator 832 can utilize similar techniques as demodulator 822, but with using the in-phase and quadrature components on both sets of signals. The demodulator 832 can generate output data 828 that includes both (i) a bit that represents the polarization used for transmission and (ii) one or more bits that represent the demodulated bits according to the modulation scheme of both received sets of signals. For example, the demodulator 832 can view the following symbols and output their respective bits: symbol A (1, 1, 0, 0) equates to bits "000", symbol B (1, -1, 0, 0) equates to bits "001", symbol C (-1, -1, 0, 0) equates to bits "010", symbol D (-1, 1, 0, 0) equates to bits "011", symbol E (0, 0, 1, 1) equates to bits "100", symbol F (0, 0, 1, -1) equates to bits "101", symbol G (0, 0, -1, -1) equates to bits "110", and symbol H (0, 0, -1, 1) equates to bits "111". Other examples of symbols to bits representations are also possible.

In the above example, the demodulator 832 can analyze each of these symbols A-H in a three-dimensional constellation. The demodulator 832 can receive both downconverted sets of signals, convert both downconverted sets of signals to the digital domain, and collectively map the inphase and quadrature components of the digital sets of signals to a symbol of the three-dimensional constellation that best fits to the received digital sets of signals. For example, if the demodulator 832 receives a symbol with values of (0.1, 0.1, -0.9, -0.8), then the demodulator 832 can determine with high confidence this received symbol maps to symbol G, and can output the corresponding bits of "110" to the output interface 830.

The demodulator 832 can utilize one or more trained machine-learning models that are configured to output data that represents the corresponding bits of the received symbol. The one or more trained machine-learning models can receive, as input, $I_{H-pol}$, $Q_{H-pol}$, $I_{V-pol}$, and $Q_{v-pol}$ values, and output data that represents a corresponding bit representation and a percentage or likelihood of a confidence in the output bit representation. For example, the one or more trained machine-learning models can output bits "111" and a confidence level of 99%, in response to processing the receive data symbol of (0.01, 0.02, -0.99, 0.99). The one or more trained machine-learning models can also receive noise measurements on both received sets of signals, historical levels of noise, energy levels of both received sets of signals, and other statistical characteristics of both received sets of signals. The demodulator 832 can compare the trained machine-learning models' output to a threshold value to improve the accuracy of its detection. If the output satisfies the threshold value, the demodulator 832 can output the trained machine-learning models' corresponding bits to the output interface 830.

Figure 8D:
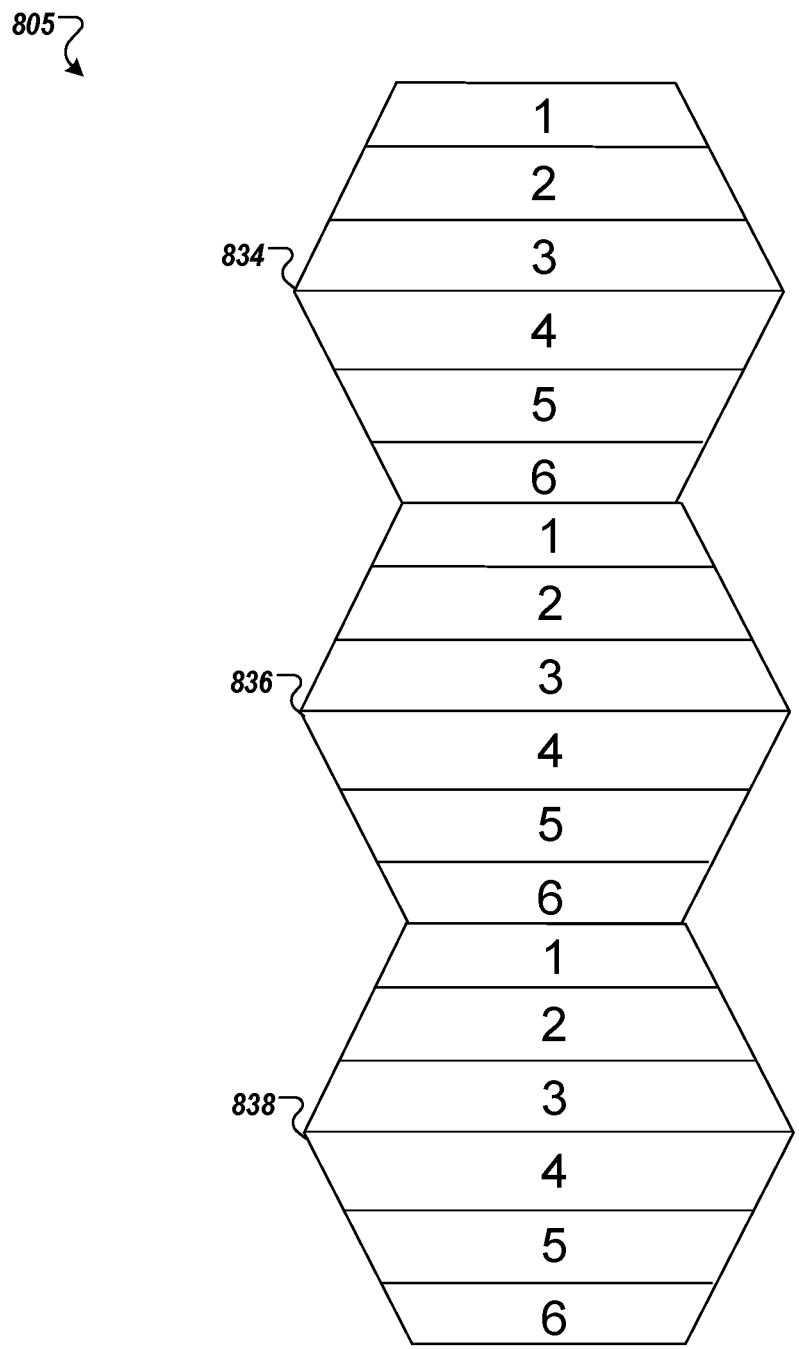
FIG. 8D is a diagram showing an example of a scheme for managing assignments of resources in a satellite communication system.

FIG. 8D is a diagram showing an example 805 of a satellite reuse scheme. In the example shown in FIG. 8D, a transmitter and receiver can communicate using a channel bonding technique. In the channel bonding technique, a data stream is split between two over-the-air channels and transmitted concurrently. When the channel bonding technique is applied, a transmitter can utilize two full transmit chains that operate simultaneously on a data stream and does not include a switch, such as switch 514. For example, terminal 130-1 may include two RF transmit chains 102, one RF transmit chain connects to the vertical polarization antenna and the other RF transmit chain connects to the horizontal polarization antenna, to name some examples.

In some implementations, the transmitter communicates with a receiver using the channel bonding technique. The transmitter can communicate with the receiver using channel bonding with different polarization channel pairs, and include various scheduling and assignments in the TDMA scheme to limit interference between beams. Ideally, the channel bonding scheme seeks to limit interference between beams. For example, a satellite 120 includes spot beams that are used concurrently and cover different geographic regions of the Earth. The beams sweep across ground regions of the Earth over time. The example 805 illustrates various regions of the Earth that represent the spot beams, e.g., spot beam 834, spot beam 836, and spot beam 838. Each spot beam is divided into six different strips, e.g., strip 1 through strip 6, in a vertical manner. With the arrangement of each spot beam being divided into six different strips, transmission scheduling can ensure a "stay out distance" is achieved due to the terminals transmitting simultaneously from adjacent beams being separated by at least two geographical strips. For example, the communication system that employs the channel bonding scheme employ a fine-grained position determination based on a location of terminals to localize them to the strips in each spot beam. This technique can include utilizing a 2-reuse scheme, which can improve the overall channel capacity during transmission.

Generally, only one terminal, e.g., terminal 130-1 for example, can transmit a terminal data burst per time slot per beam. However, the gateway system 105 can incorporate an additional coordination feature such that, for each pair of adjacent spot beams, i.e., spot beam 834 and 836 for example, a terminal can transmit in the same time slot as another terminal so long as the two terminals are at least two geographical strips apart from one another, i.e., the "stay-out distance condition". If the gateway system 105 determine the stay-out distance condition is not met, e.g., two terminals are within two geographical strips apart from one another, then the gateway system 105 pushes one of the two terminals to the next available subsequent time slot so no conflict or interference occurs. In this example, the terminal not bumped can continue to transmit at its originally scheduled time slot.

In some implementations, the gateway system 105 can designate time slots for terminal transmissions in a manner in which proximate spot beams can communicate together. For example, the gateway system 105 can set assignments for a time slot sequentially in a geographically order. This can include, for example, scheduling terminals in spot beam 834 to transmit in strip 1, followed by strip 2, followed by strip 3, and up to strip 6. Afterwards, the terminals in spot beam 836 can transmit, starting in strip 1, followed by strip 2, followed by strip 3, and up to strip 6. The same repeats for spot beam 838. In some implementations, the gateway system 105 can designate the more fine-grained approach for slot transmission such that the gateway system 105 can decide whether a desired assignment conflicts with one or more assignments previously created for the two strips above it. For example, when scheduling transmission slots for terminals in strip 2 of spot beam 836, the gateway system 105 can determine whether conflicts exist with transmission slots for terminals in strip 6 of spot beam 834.

For example, the gateway system 105 can designate that two terminals in two adjacent spot beams can transmit on the same polarization, and these two terminals can be ⅓ of the spot beam distance away, i.e., ⅔ radius of the spot beam or 2 geographical strips apart from one another. Thus, the mutual interference between terminals transmitting on the same polarization in two adjacent spot beams can be minimized. For example, if terminal 130-1 is located in strip 1 through 4 of spot beam 834, then terminal 130-2 can transmit at any strip of spot beam 836. However, if terminal 130-1 is located in strip 5 of spot beam 834, then the gateway system 105 can schedule transmission of terminal 130-2 that is located in strips 2 through 6 of spot beam 836, excluding strip 1 in spot beam 836. Similarly, if terminal 130-1 is in strip 6 of spot beam 834, terminal 130-2 can transmit in spot beam 836 in strips 3 through 6, as strips 1 and 2 of spot beam 836 are excluded. The gateway system 105 can schedule the transmissions from top of the column and sequence the scheduling downward. The gateway system 105 can include precoding to transmit to terminals located near spot beam edges, e.g., strips 1 and 6 of each spot beam. Various types of precoding can be used, including frame-based precoding, block singular value decomposition (Block-SVD) precoding, or minimum square error (MMSE) precoding.

In some implementations, the transmitter and receiver can coordinate communications on different polarizations to improve various performance attributes. For example, instead of transmitting data on different RF transmit chains independently, the transmitter can define each symbol in terms of transmission on both channels simultaneously. For example, the transmitter may transmit a coordinated dual QPSK using both polarizations, e.g., vertical and horizontal polarizations, simultaneously. By incorporating a coordination across both polarizations during transmission, the receiver can experience improved performance in bit error rate, noise performance, and distinguishing between different symbols in the face of noise. In this example, during a symbol time, 16 possible combinations (4 bits of information) can be received by the receiver. For example, a coordinated QPSK across both polarizations may include the following: symbol A (1, 1, 0, 0) equates to bits "0000", symbol B (1, −1, 0, 0) equates to bits "0001", symbol C (−1, −1, 0, 0) equates to bits "0010", symbol D (−1, 1, 0, 0) equates to bits "0011" symbol E (0, 0, 1, 1) equates to bits "0100", symbol F (0, 0, 1, −1) equates to bits "0101", symbol G (0, 0, −1, −1) equates to bits "0110", symbol H (0, 0, −1, 1) equates to bits "0111", symbol I (1, 1, 1, 1) equates to bits "1000", symbol J (1, −1, 1, −1) equates to bits "1001", symbol K (−1, −1, −1,−1) equates to bits "1010", symbol L (−1, 1, −1, 1) equates to bits "1011", symbol M (−1, −1, 1, 1) equates to bits "1100", symbol N (−1, −1, 1, −1) equates to bits "1101", symbol O (1, 1, −1, −1) equates to bits "1110", and symbol P (1, −1, −1, 1) equates to bits "1111". In this example, the constellation diagram can include a similar three-dimensional constellation diagram as described with respect to FIG. 8C, but with the addition of two "diagonal" planes that each also have four symbols. The addition of the two diagonal planes enables for improved discrimination by the receiver when determining which symbol was likely received.

In the aforementioned example, when transmitting symbol A at a terminal, one RF transmit chain can transmit the first two symbols (1, 1) and the second RF transmit chain can transmit the second two symbols (0, 0), simultaneously. Moreover, this terminal can transmit symbol A so long as its location is greater than at least two geographical strips away from another terminal transmitting in a different spot beam, according to the stay out condition. In this manner, the transmitter and receiver can avoid interference with other transmissions and improve the reliability of reception.

Figure 9:
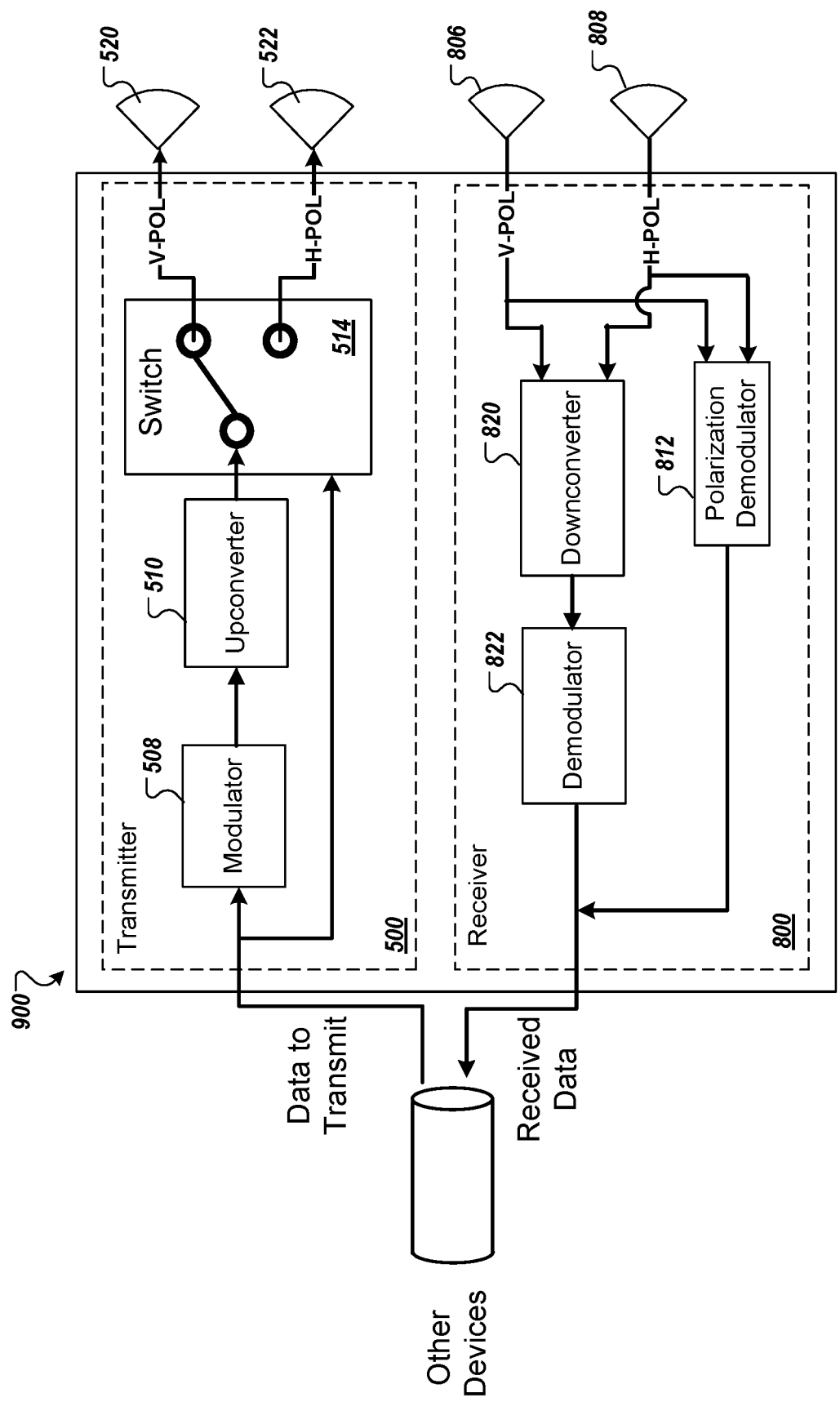
FIG. 9 is a diagram showing an example of a transceiver that can transmit and receive signals transmitted using carrier modulation and modulation of electromagnetic.

FIG. 9 is a diagram showing an example of a transceiver 900 that can dynamically adjust electromagnetic polarization during data transmission and data reception. The transceiver 900 can include both a transmitter and a receiver, and multiple transmitters and multiple receivers. The transceiver 900 can include, for example, the transmitter 500 and a receiver 800. The transceiver can also include a different receiver, such as described with respect to FIGS. 8B through 8D. The transceiver can be included within the gateway system 105 and each of the terminals 130.

In some implementations, the transceiver 900 can be used to communicate in a variety of different wireless communication applications, and not only for satellite communications. For example, the transceiver 900 can be used to enhance throughput for Bluetooth, Wi-Fi, cellular, and other wireless communication applications.

In some implementations, the transceiver 900 can enable communications between the receiver 800 and the transmitter 500. For example, the receiver 800 may receive data from a terminal 130-1 and output symbols to be demodulated. However, in this example, the receiver 800 can provide the output symbols to the transmitter 500 through the transceiver 900. The transmitter 500 of the transceiver 900 can then transmit those output symbols to a different terminal or device, e.g., terminal 130-2, over the vertical or horizontal polarization antenna. Similarly, the transceiver 900 can receive the data at the receiver 800 from terminal 130-1, process the data, supply the processed data to the transmitter 500 from the receiver 800, and transmit the received data back to the terminal 130-1 over the vertical or horizontal polarization antenna. This may be the case in which the transmitter 500 sends an acknowledgement to the terminal 130-1. The transceiver 900 can supply different data to be transmitted to the terminal 130-1 in response to processing the data received by the terminal 130-1.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A communication device comprising:
    a transmitter configured to encode data to transmit using a combination of (i) modulation of a radio frequency carrier signal and (ii) variation of a polarization with which the modulated signal is transmitted, wherein the transmitter comprises:
        an input interface to receive input data for transmission;
        a first antenna feed to receive signals for transmission with a first polarization;
        a second antenna feed to receive signals for transmission with a second polarization;

a modulator configured to generate modulated output that encodes a first subset of the input data according to a modulation scheme;

an upconverter configured to upconvert the modulated output of the modulator to generate upconverted output; and a switch configured to selectively provide the upconverted output to the antenna feeds, wherein the switch is controlled to select between the first antenna feed and the second antenna feed such that the selection encodes a second subset of the input data in the polarization with which the upconverted output is transmitted.

2. The communication device of claim 1, further comprising a switch controller synchronized with the modulator, wherein the switch controller is configured to, for each symbol of multiple symbols transmitted:

receive a bit from the second subset of the input data; and set the switch to select between the first antenna feed and the second antenna feed based on the received bit.

3. The communication device of claim 1, wherein the modulation scheme encodes n bits per symbol, and the selection of polarization encodes one bit per symbol, such that each transmitted symbol encodes n+1 bits of information.

4. The communication device of claim 1, wherein the modulation scheme encodes n bits per symbol, wherein the input data is a bitstream and the first subset and the second subset are extracted from the bitstream, and wherein the second subset of the input data comprises bits of the bitstream spaced apart by n bits in the bitstream.

5. The communication device of claim 1, wherein the switch is a single-pole double-throw (SPDT) switch implemented using a gallium arsenide semiconductor chip.

6. The communication device of claim 1, wherein the modulator encodes data in symbols using the modulation scheme, and wherein the communication device is configured to use the switch to select from among the polarizations for each symbol.

7. The communication device of claim 1, wherein the first polarization is horizontal polarization and the second polarization is vertical polarization.

8. The communication device of claim 1, wherein the first polarization is right-hand circular polarization (RHCP) and the second polarization is left-hand circular polarization (LHCP).

9. The communication device of claim 1, wherein the communication device is configured to operate the modulator using any of multiple modulation schemes, and wherein the communication device is configured to encode an additional bit per symbol for each of the multiple modulation schemes through the polarization for transmission of each symbol.

10. The communication device of claim 1, wherein the communication device is configured to use a single RF transmit chain to transmit the input data, wherein the single RF transmit chain includes the modulator and upconverter and does not include any other modulators or upconverters in the single RF transmit chain.

11. The communication device of claim 1, wherein the communication device comprises a receiver configured to receive data over a wireless communication channel having data transmitted through (i) modulation of a radio frequency carrier signal and (ii) variation of polarizations used to transmit the modulated signals, wherein the receiver comprises:

a first input line to receive signals transmitted with the first polarization;

a second input line to receive signals transmitted with the second polarization;

a polarization demodulator configured to (i) determine whether the first input line or the second input line receives transmitted signals, and (ii) extract transmitted data based on which of the input lines carries transmitted signals;

a downconverter configured to downconvert received signals to generate the downconverted output;

a demodulator configured to generate an output data by decoding the downconverted output according to a modulation scheme;

a data combiner configured to combine the output bit stream with the data representative of the identified polarization type from the polarization demodulator; and an output interface to provide the combined output bit stream with the data representative of the identified polarization type for output.

12. The communication device of claim 11, wherein the receiver comprises a signal combiner configured to generate a combined signal sum together (i) signals from the first input line that were transmitted with the first polarization and (ii) signals from the second input line that were transmitted with the second polarization; and wherein the downconverter is arranged to downconvert the combined signal.

13. The communication device of claim 11, wherein the receiver comprises a radio frequency multiplexer configured to (i) receive signals from the first input line and signals from the second input line and to (ii) selectively pass signals from only one of the input lines at a time based on output of the polarization decoder; and wherein the downconverter is arranged to downconvert the output of the radio frequency multiplexer signal.

14. The communication device of claim 11, wherein the data combiner is configured to interleave bits extracted based on the identified polarization of received transmissions with bits decoded based on the demodulation of symbols transmitted according to the modulation scheme.

15. The communication device of claim 11, wherein the polarization demodulator is configured to:

receive (i) first signals from the first input line that were received with an antenna for the first polarization and (ii) signals from the second input line that were received with an antenna for the second polarization;

determine characteristics of the first signals and characteristics of the second signals;

compare the characteristics of the first signals and the characteristics of the second signals;

identify which of the first polarization and second polarization was used to transmit a received symbol based on the comparison of the characteristics of the first signals and the second signals; and provide a received data bit determined based on the identified polarization type.

16. A method performed by a communication device, the method comprising:

receiving, by the communication device, input data to transmit over a wireless communication channel, wherein the communication device has a (i) first antenna feed to receive signals for transmission with a first polarization and (ii) a second antenna feed to receive signals for transmission with a second polarization;

modulating, by the communication device, a radio frequency carrier signal to generate modulated output that encodes a first subset of the input data according to a modulation scheme;

upconverting, by the communication device, the modulated output of the modulator to generate upconverted output; and selectively providing, by the communication device, the upconverted output to the antenna feeds by controlling a switch to select between the first antenna feed and the second antenna feed such that the selection encodes a second subset of the input data in the polarization with which the upconverted output is transmitted.

17. The communication device of claim 16, wherein controlling the switch to select between the first antenna feed and the second antenna feed comprises:

for each symbol of multiple symbols transmitted:
receiving a bit from the second subset of the input data;
setting the switch to select between the first antenna feed and the second antenna feed based on the received bit; and
transmitting the symbol that encodes one or more bits of the first subset of the input data on the antenna feed selected based on the received bit of the second subset of the input data.

18. The communication device of claim 16, further comprising:

receiving (i) first signals having the first polarization and (ii) second signals having the second polarization; and
obtaining a data stream transmitted using the first signals and the second symbols, including by, for each of multiple symbol periods:
determining, from among the first polarization and the second polarization, which polarization was used to transmit a symbol for the symbol period;
identifying a first bit of information of the data stream based on the determined polarization used to transmit the symbol for the symbol period;
demodulating a modulated signal for the symbol period to identify one or more second bits of information of the data stream, wherein the modulated symbol comprises:
a summation of (i) signals received for the symbol period for the first polarization and (ii) signals received for the symbol period for the second polarization; or
signals received for the symbol period from a single one of the first polarization and second polarization; and
including the first bit of information and the one or more second bits of information in the data stream.

19. One or more non-transitory machine-readable media storing instructions that are operable, when executed by one or more processors of a communication device, to cause the communication device to perform operations comprising:

receiving, by the communication device, input data to transmit over a wireless communication channel, wherein the communication device has a (i) first antenna feed to receive signals for transmission with a first polarization and (ii) a second antenna feed to receive signals for transmission with a second polarization;

modulating, by the communication device, a radio frequency carrier to generate modulated output that encodes a first subset of the input data according to a modulation scheme;

upconverting, by the communication device, the modulated output of the modulator to generate upconverted output; and selectively providing, by the communication device, the upconverted output to the antenna feeds by controlling a switch to select between the first antenna feed and the second antenna feed such that the selection encodes a second subset of the input data in the polarization with which the upconverted output is transmitted.

20. The one or more machine-readable media of claim 19, wherein controlling the switch to select between the first antenna feed and the second antenna feed comprises:

for each symbol of multiple symbols transmitted:
receiving a bit from the second subset of the input data;
setting the switch to select between the first antenna feed and the second antenna feed based on the received bit; and
transmitting the symbol that encodes one or more bits of the first subset of the input data on the antenna feed selected based on the received bit of the second subset of the input data.

* * * * *